United States Patent [19]

Kato et al.

[11] Patent Number: 5,519,685
[45] Date of Patent: May 21, 1996

[54] OPTICAL PICKUP HEAD APPARATUS CAPABLE OF SUPPRESSING CROSSTALK FROM ADJACENT TRACKS AND IN THE RECORDING LINE DENSITY DIRECTION

[75] Inventors: Makoto Kato, Hyogo; Hiroaki Yamamoto, Osaka; Seiji Nishino, Osaka; Shin-ichi Kadowaki, Osaka, all of Japan

[73] Assignee: Matsushita Electric Industrial Co., Ltd., Kadoma, Japan

[21] Appl. No.: 111,959

[22] Filed: Aug. 26, 1993

[30] Foreign Application Priority Data

Nov. 12, 1992 [JP] Japan .................................. 4-301917

[51] Int. Cl.$^6$ .................................................. G11B 7/00
[52] U.S. Cl. ...................................... 369/110; 369/44.37
[58] Field of Search .............................. 369/44.37, 110, 369/112, 109, 44.38, 44.41

[56] References Cited

U.S. PATENT DOCUMENTS

| | | |
|---|---|---|
| 3,992,574 | 11/1976 | Bouwhuis et al. . |
| 4,929,823 | 5/1990 | Kato et al. . |
| 5,025,438 | 6/1991 | Emoto .................... 369/112 |
| 5,062,098 | 10/1991 | Hori et al. . |
| 5,113,378 | 5/1992 | Kimura . |

FOREIGN PATENT DOCUMENTS

| | | |
|---|---|---|
| 50-78341 | 6/1975 | Japan . |
| 57-58248 | 4/1982 | Japan . |
| 57-058248 | 4/1982 | Japan . |
| 02101641 | 4/1990 | Japan .................... 369/110 |
| 03157843 | 7/1991 | Japan . |
| 04049535 | 2/1992 | Japan . |
| 4085510 | 3/1992 | Japan . |

OTHER PUBLICATIONS

Japanese Journal of Applied Physics, vol. 31, No. 1–2B, Feb. 1992 pp. 630–634, Katayama et al., "Multi–Beam Optical Disk Drive for High Data Transfer Rate Systems".

Multi–Beam Optical Disk Drive for High data Transfer Rate Systems Proc. Int. Symp. on Optical Memory, 1991, pp. 268–272.

Holographic Optical Element with Analyzer Function for Magneto–Optical Disk Head, Japanese Journal of Applied Physics, vol. 28 (1989) Supplement 28–3, pp. 359–361.

*Primary Examiner*—Gerogia Y. Epps
*Assistant Examiner*—P. W. Huber
*Attorney, Agent, or Firm*—Willian Brinks Hofer Gilson & Lione

[57] ABSTRACT

An optical pickup head apparatus comprises a first coherent light source for emitting a coherent light serving as a main beam, and a second coherent light source for emitting a coherent light having a polarized plane at a right angle to the polarized plane of the coherent light emitted from the first coherent light source. When the coherent light emitted from the second coherent light source is incident upon a phase plate, the phase plate yields a sub-beam presenting a distribution of light intensity having peak values at at least both sides of the center of the sub-beam on a plane vertical with respect to the optical axis of the coherent light. Focusing means overlaps the main beam emitted from the first coherent light source on the sub-beam emitted from the phase plate, causing the resulting overlapped beam to be focused on the information-recorded surface of an optical disk. When a focused beam as reflected from the information-recorded surface of the optical disk is incident upon polarized beam separating means, the polarized beam separating means yields the transmitted beam as divided into the main beam and the sub-beam. Optical detecting means individually detects and supplies the light intensities of the main beam and the sub-beam emitted from the polarized beam separating means.

7 Claims, 22 Drawing Sheets

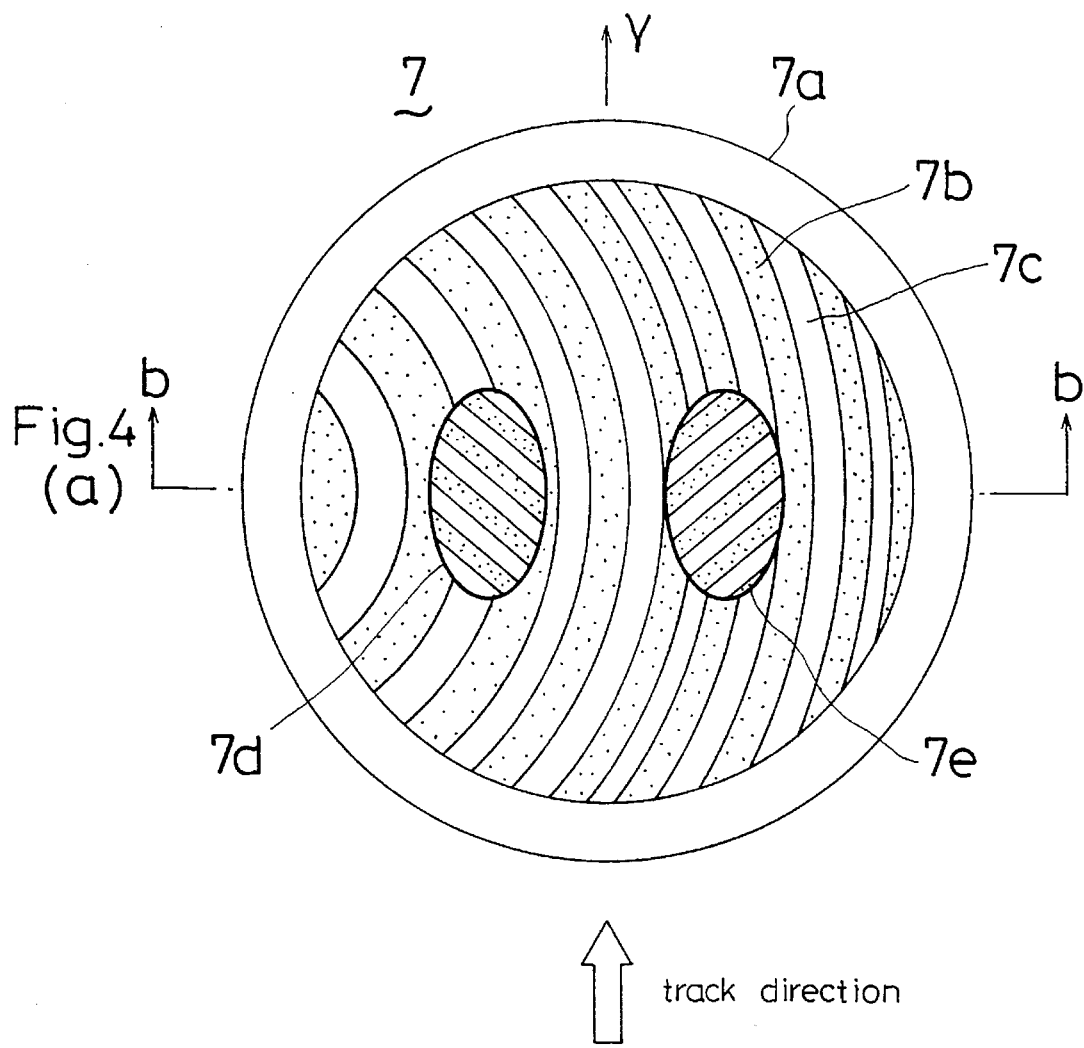
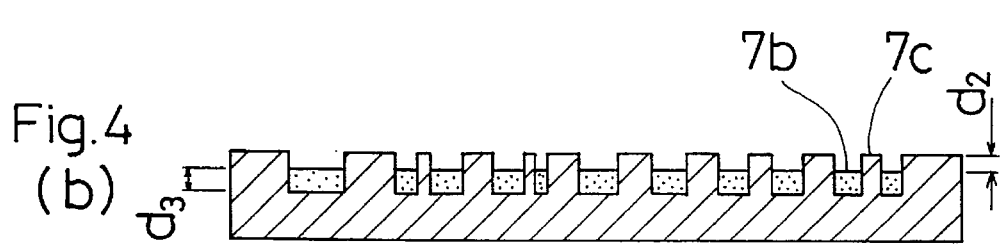

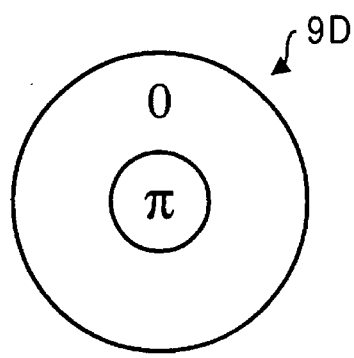
FIG. 13(a)
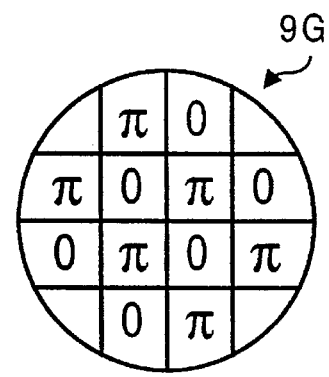
FIG. 13(b)
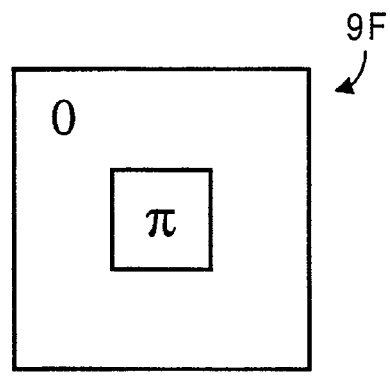
FIG. 13(c)
FIG. 13(d)

depth of a phase compensating groove
$d_a(\mu m)$ depth of a phase compensating groove
$d_a(\mu m)$

OPTICAL PICKUP HEAD APPARATUS CAPABLE OF SUPPRESSING CROSSTALK FROM ADJACENT TRACKS AND IN THE RECORDING LINE DENSITY DIRECTION

BACKGROUND OF THE INVENTION

The present invention relates to an optical pickup head apparatus for scanning an object with a focused beam to read out information stored in the object with high density, and more particularly to an optical pickup head apparatus for an optical disk.

In the optical pickup head apparatus above-mentioned, the half width ε of a focused beam basically places limits on the information reading function. Here, ε is given by the wavelength λ of a light source and the numerical aperture NA of an objective lens according to the following equation:

$$\epsilon = \alpha \times (\lambda / NA) \quad (1)$$

wherein α is a constant to be determined by the opening shapes of the apertures of the objective lens and the complex amplitude distribution of a beam at the aperture of the objective lens.

Generally, the information-recorded surface of an optical disk is formed by discrete patterns 50a, 50b, 50c, ... made in the form of pits as shown in FIG. 21. The beam size of a reading beam 50A is determined by the equation (1). Accordingly, when ε is not sufficiently small as compared with a track pitch $P_t$, the reading beam 50A also reads out signals of adjacent tracks. Such crosstalks disadvantageously prevent a signal from being accurately read out in a stable manner.

To suppress such crosstalks, there is proposed an optical pickup head apparatus capable of reading high-density information, as disclosed in Japanese Patent Laid-Open Publication No. 57-58248. In this optical pickup head apparatus, there are used, as reading beams, three beams, i.e., a first beam 50A which is located in the center, and second and third beams 50B and 50C which are respectively located at both sides of the first beam 50A, as shown in FIG. 21. The second and third beams 50B, 50C are separated from the first beam 50A by a track pitch $P_t$ in directions at right angles to the tracks.

The optical pickup head apparatus above-mentioned has an arrangement as shown in FIG. 22. More specifically, there are used, as light sources, a first semiconductor laser 51, a second semiconductor laser 52 and a third semiconductor laser 53. A beam emitted from the first semiconductor laser 51 passes through a first beam splitter 54, a collimate lens 55 and a second beam splitter 56. Then, the beam is focused by an objective lens 57 and reaches the information-recorded surface of an optical disk 58. A beam emitted from the second semiconductor laser 52 and a beam emitted from the third semiconductor laser 53 pass through a third beam splitter 59, the first beam splitter 54, the collimate lens 55 and the second beam splitter 56. Then, these beams are focused by the objective lens 57 and reach the information-recorded surface of the optical disk 58. Three beams emitted from the first, second and third semiconductor lasers 51, 52, 53 form images on the information-recorded surface of the optical disk 58 with a predetermined positional relationship. The reflected lights of these beams return back to the first to third semiconductor lasers 51, 52, 53, respectively, where the amounts of the beams serving as signals are read out by the self-coupling effects of the semiconductor lasers 51, 52, 53.

When it is supposed that the amount of a crosstalk of each of the first to third beams 50A, 50B, 50C with respect to adjacent tracks is set to k, the amounts of signal lights $S_A$, $S_B$, $S_C$ respectively obtained from the first to third beams 50A, 50B, 50C are expressed according to the following equations:

$$S_A = k S_{-1} + S_0 + k S_{+1} \quad (2)$$

$$S_B = k S_{-2} + S_{-1} + k S_0 \quad (3)$$

$$S_C = k S_0 + S_{-1} + k S_{+2} \quad (4)$$

wherein $S_{-2}$, $S_{-1}$, $S_0$, $S_{+1}$, and $S_{+2}$ refer to the amounts of signal lights obtained when beams are incident upon the centers of the tracks −2, −1, 0, +1, +2, respectively. In the equations above-mentioned, the amounts of signal lights from second adjacent tracks which are so small, are disregarded.

From the equations above-mentioned (2), (3), (4), the following equation is obtained as an equation of operational processing for suppressing a crosstalk:

$$S - kS' - kS'' = (1 - 2k^2) \left\{ S_0 - \frac{k^2}{1 - 2k^2} S_{-2} - \frac{k^2}{1 - 2k^2} S_{+2} \right\} \quad (5)$$

$$\approx (1 - 2k^2) \times S_0 \quad (6)$$

The amount of a crosstalk at the time when reading the amount of a signal light by a single beam, reaches the level of 2 k. However, when an operational processing is executed according to the equation (5), the amount of a crosstalk can be reduced to $2 k^2/(1-2k^2)$, i.e., the level of $2 k^2$. Accordingly, the track pitch $P_t$ of pits to be recorded, can be narrowed.

To accurately focus, on the information-recorded surface of the optical disk 58, the first to third beams 50A, 50B, 50C which are put close to one another with the track pitch $P_t$ above-mentioned, it is required that beams emitted from the three independent first to third semiconductor lasers 51, 52, 53 are adjusted with high precision and put in a single luminous flux. On the other hand, the beams which are reflected and returned, as partially overlapping one another, from the optical disk 58, cannot be individually guided to independent photodetectors. Accordingly, the signals are read out by the self-coupling effects of the first to third semiconductor lasers 51, 52, 53.

When reading the amounts of signal lights, it is difficult to avoid the influence of noise by return lights generated in the first to third semiconductor lasers 51, 52, 53. This prevents the acquirement of highly precise signals each having a stable S/N ratio.

In this connection, there is proposed a method of reading the information of adjacent tracks with the use of independent photodetectors, as shown in "Multi-Beam Optical Disk Drive for High Data Transfer Rate Systems", Proc. Int. Symp. on Optical Memory, 1991, pp. 268–272, by R. Katayama et al. More specifically, as shown in FIG. 23, there are provided a sufficient distance 1 in the tracking direction between a main beam 60 and each of sub-beams 60A, 60B, and output signals obtained by photoelectrically converting the main beam 60 and the sub-beams 60A, 60B are subjected to an operational processing with the use of an adaptive digital filter, thereby to suppress regenerated signals from adjacent tracks, as well as intersymbol interference in the recording line density direction.

In the method above-mentioned, however, it is required to adjust the spot positions of the main beam 60 and the sub-beams 60A, 60B such that a track is scanned by the main beam 60 and the sub-beams 60A, 60B with the distance 1

(which is not less than several tens μm) between the main beam 60 and each of the sub-beams 60A, 60B accurately maintained at both inner and outer peripheral portions of an optical disk. This requires a complicated optical system and a complicated control mechanism. This is disadvantageous in view of stabilization and miniaturization of an optical pickup head apparatus. Further, there are also required timing control for compensating time delays between the main beam 60 and the sub-beams 60A, 60B, as well as other complicated signal processings.

SUMMARY OF THE INVENTION

It is an object of the present invention to provide an optical pickup head apparatus capable of suppressing a crosstalk from adjacent tracks and a crosstalk in the recording line density direction, i.e., intersymbol interference.

To achieve the object above-mentioned, a first optical pickup head apparatus according to the present invention, uses a main beam and a sub-beam of which respective polarized planes are at right angles to each other. One beam is made, for example, in the form of a spot as focused in a normal Airy pattern, while the other beam is formed, for example, in a two-peak beam which is symmetric with respect to the optical axis thereof. The one and other beams are focused, as overlapped on each other, on the pit surface of an optical disk, and the focused beam as reflected from the pit surface of the optical disk is divided into the main beam and the sub-beam with the use of the fact that the polarized plane of the main beam is at a right angle to the polarized plane of the sub-beam. The main beam and the sub-beam thus separated from each other are individually detected by photodetectors.

More specifically, the first optical pickup head apparatus comprises: a first coherent light source for emitting a coherent light serving as a main beam; a second coherent light source for emitting a coherent light having a polarized plane at a right angle to the polarized plane of the coherent light emitted from the first coherent light source; a phase plate upon which the coherent light emitted from the second coherent light source is incident for emitting a sub-beam presenting a distribution of light intensity in which peak values are located at at least both sides of the center of the sub-beam on a plane vertical with respect to the optical axis of the coherent light; condensing means for overlapping the main beam emitted from the first coherent light source on the sub-beam emitted from the phase plate, causing the resulting overlapped beam to be focused on the information-recorded surface of an optical disk; polarized beam separating means upon which a focused beam as reflected from the information-recorded surface of the optical disk is incident for emitting the incident focused beam as divided into the main beam and the sub-beam; photodetecting means for individually detecting and supplying the light intensities of the main beam and the sub-beam emitted from the polarized beam separating means; and reading signal operating means for operating, based on output signals from the photodetecting means, a reading signal in which a crosstalk is suppressed.

According to the first optical pickup head apparatus, the main beam forms a profile in a normal Airy disc-like pattern, but the sub-beam of which polarized plane is at a right angle to the polarized plane of the main beam, has a profile presenting a half width slightly greater than the half width of the main beam on the light focusing plane. Accordingly, the sub-beam is reflected as a beam containing more information of adjacent tracks on the information-recorded surface of an optical disk.

The focused beam reflected from the information-recorded surface of the optical disk, is divided into the main beam and the sub-beam by the polarized beam separating means. Then, the light intensity of the main beam and the light intensity of the sub-beam are individually detected by the photodetecting means.

According to the first optical pickup head apparatus, the information-recorded surface of the optical disk is scanned with a beam obtained by overlapping the main beam on the sub-beam, the main beam having a polarized plane at a right angle to the polarized plane of the sub-beam. Here, since the main beam reads out information of the optical disk in which tracks are arranged with high density substantially to the extent of a diffraction limit of the focused main beam, the sub-beam is used as an auxiliary beam containing a crosstalk component much more than that of the main beam. In a return path, there is disposed the polarized beam separating means for dividing the beam into the main beam and the sub-beam, and the photodetecting means individually detects the light intensity of the main beam and the light intensity of the sub-beam. This enables the signal operating means to operate an information reading signal in which a crosstalk is suppressed. Thus, there can be effectively obtained, from the high-density information-recorded surface of the optical disk, a reading signal in which a crosstalk is suppressed.

The phase plate causes the sub-beam to be focused, on the optical disk surface, as a beam having a two-peak profile of which half width is greater than that of the main beam. Thus, a simple and stable optical system can be achieved. Accordingly, the first optical pickup head apparatus can be readily adjusted with respect to the eccentricity of an optical disk as compared with a conventional three-beam system.

Preferably, the first optical pickup head apparatus is arranged such that the first and second coherent light sources are a pair of linearly polarized lasers disposed such that the polarized planes of the coherent lights emitted therefrom are at right angles to each other. In such an arrangement, there can be readily and securely obtained coherent lights of which polarized planes are at right angles to each other. Thus, there can be readily and securely obtained, from the high-density information-recorded surface of the optical disk, a reading signal in which a crosstalk is suppressed.

Preferably, the first optical pickup head apparatus is arranged such that the polarized beam separating means is a polarized holographic optical element (HOE) having a substrate of which refractive index is uniaxial and anisotropic, and a polarized hologram formed on the substrate by a photolithographic technology. In such an arrangement, the photodetecting means can be integrated in a single plane since the polarized holographic element is smaller than a refraction-type element such as a Wollaston prism, and the polarized holographic optical element can be produced more readily with a lower cost as compared with a conventional refraction-type element required to be polished.

Preferably, the first optical pickup head apparatus is arranged such that the photodetecting means includes a main beam detector for detecting the light intensity of the main beam and a sub-beam detector unit for detecting the light intensity of the sub-beam, the sub-beam detector unit including two photodetectors as divided in the tangential direction of the track at the reading point of the optical disk, and that there is further disposed error signal supply means for supplying, as a tracking error signal, a differential output signal obtained from the two photodetectors.

According to a second optical pickup head apparatus of the present invention, a polarized phase plate divides a beam emitted from a single coherent light source into two beams, i.e, a main beam in the form of a spot as focused in a normal Airy pattern, and a two-peak sub-beam which is symmetric with respect to the optical axis thereof, these two beams having polarized planes at right angles to each other. These beams are focused, as overlapped on each other, on the information-recorded surface of an optical disk, and a focused beam as reflected from the information-recorded surface is divided into the main beam and the sub-beam with the use of the fact that the polarized plane of the main beam is at a right angle to the polarized plane of the sub-beam. The main beam and the sub-beam thus separated from each other are individually detected by photodetectors.

More specifically, a second optical pickup head apparatus comprises; a coherent light source for emitting a coherent light; a polarized phase plate upon which the coherent light emitted from the coherent light source is incident for emitting a main beam and a sub-beam which has a polarized plane at a right angle to the polarized plane of the main beam and which presents a distribution of light intensity having peak values at at least both sides of the center of the main beam; focusing means for overlapping, on each other, the main beam and the sub-beam emitted from the polarized phase plate, causing the resulting overlapped beams to be focused on the information-recorded surface of an optical disk; polarized beam separating means upon which the focused beams as reflected from the information-recorded surface of the optical disk are incident for splitting the incident beams as divided into the main beam and the sub-beam; photodetecting means for individually detecting and supplying the light intensities of the main beam and the sub-beam split from the polarized beam separating means; and reading signal operating means for operating, based on output signals from the photodetecting means, a reading signal in which a crosstalk is suppressed.

According to the second optical pickup head apparatus, when a beam emitted from the single coherent light source passes through the polarized phase plate, the polarized phase plate splits a main beam and a sub-beam which has a polarized plane at a right angle to the polarized plane of the main beam and which presents a distribution of light intensity having peak values at at least both sides of the center of the main beam. Accordingly, there can be obtained, from the single coherent light source, a pair of coherent lights of which respective polarized planes are at right angles to each other. In reading information from an optical disk, the main beam and the sub-beam scan, as overlapping each other without interference with each other, the optical disk surface. However, in the return path, the main beam and the sub-beam are separated from each other, thus enabling to execute a signal processing with a crosstalk effectively suppressed.

The main beam and the sub-beam are formed by passing a beam emitted from the single coherent light source through the polarized phase plate. Accordingly, the beam axes of the main beam and the sub-beam are always aligned with each other and are never positionally shifted from each other.

In a conventional optical pickup head apparatus, when signal reading beams are detected with the distance between adjacent beams set to 10 times or more of the diameter of the focused beam, the optical system itself becomes complicated and the adjusting and controlling mechanism becomes also very complicated. Further, such beam detection is unstable due to uneven rotation and eccentricity of an optical disk itself, and other factors. According to the second optical pickup head apparatus, there can be achieved a simple and stable optical system which can simultaneously execute parallel beam processings and which can be readily adjusted.

Preferably, the second optical pickup head apparatus is arranged such that: the polarized phase plate divides a coherent light emitted from the coherent light source into a light component having a polarized plane in one direction and a light component having a polarized plane in other direction at a right angle to the one direction above-mentioned; the polarized phase plate produces, as the main beam, the light component having the polarized plane in the one direction; the polarized phase plate has first and second zones of which areas are substantially equal to each other; the first zone gives no relative phase difference to a portion of the light component having the polarized plane in the other direction, the portion above-mentioned passing through the first zone; the second zone gives a relative phase difference $\pi$ to a portion of the light component having the polarized plane in the other direction, the portion above-mentioned passing through the second zone; and the polarized phase plate produces, as the sub-beam, the light component passing through the first and second zones.

In such an arrangement, the main beam presents, on the information-recorded surface of an optical disk, a half width of diffraction limit. Due to transmission through the polarized phase plate, a relative phase difference of $\pi$ is given to the sub-beam at a ½ zone of the aperture of the polarized phase plate. Accordingly, the sub-beam becomes a two-peak beam which presents, on the information-recorded surface of an optical disk, a half width about twice of that of a diffraction limit. Therefore, this is suitable for cancelling the pit information of an optical disk which is picked up by the main beam at the base portions of the profile thereof, by the information picked up by the sub-beam at the peak portions of the profile thereof. With the respective beam centers aligned with each other, the main beam and the sub-beam are focused and scan a predetermined track on the information-recorded surface of the optical disk. The crosstalk ratio in a reading signal obtained by the sub-beam, is remarkably greater than the crosstalk ratio in a reading signal obtained by the main beam. It is therefore preferable that the sub-beam is attenuated to the level where the sub-beam contains a crosstalk in an amount equal to the amount of a crosstalk contained in the main beam, or that equivalent operations are executed by electric circuits. By supplying and differentially detecting beams as polarized and separated from each other such that the power ratio is in the range from 5:1 to 10:1, it is possible to read out information with a crosstalk stably suppressed.

Preferably, the second optical pickup head apparatus having the polarized phase plate including the first and second zones, is arranged such that each of the first and second zones is divided into two zones such that the two zones obtained by dividing the first zone and the two zones obtained by dividing the second zone are alternately disposed around the center of the polarized phase plate. In such an arrangement, there can be obtained, from the single coherent light source, the main beam and the sub-beam presenting a four-peak distribution of light intensity, the sub-beam being formed by intersecting, at right angles to each other, beam portions each of which presents a two-peak distribution of light intensity in which peaks appear at both sides of the center of the main beam. This suppresses not only crosstalks from adjacent tracks of the optical disk, but also a crosstalk in the recording line density direction. It is therefore possible to read out a signal in which both inter-track interference and intersymbol interferance are suppressed.

Preferably, the second optical pickup head apparatus is arranged such that: the polarized phase plate transmits, as the main beam, the light component having the polarized plane in the one direction out of the coherent light emitted from the coherent light source, with no relative phase difference given thereto; the polarized phase plate has first, second and third zones of which areas are substantially equal to one another; the first zone gives a relative phase difference of zero to a portion of the light component having the polarized plane in the other direction at a right angle to the one direction, out of the coherent light emitted from the coherent light source, the portion above-mentioned passing through the first zone; the second zone gives a relative phase difference of $\pi/2$ to a portion of the light component having the polarized plane in the other direction, the portion above-mentioned passing through the second zone; the third zone gives a relative phase difference of $\pi$ to a portion of the light component having the polarized plane in the other direction, the portion above-mentioned passing through the third zone; and the polarized phase plate produces, as the sub-beam, the light component passing through the first, second and third zones.

In such an arrangement, the portions of the light component having passed through the second and third zones, are emitted as sub-beam portions to which there are respectively given the relative phase differences of $\pi/2$ and $\pi$ with respect to the portion of the light component having passed through the first zone. Thus, there can be obtained a two-peak sub-beam. In the profile of the sub-beam, the base portions which spread as attenuated at the outside of the two main lobes, are attenuated substantially monotonously, and the heights of these base portions are low as compared with the heights of the turns of the base portions of the power spectra of the phase plate (in the vicinity of $1.5\times(\lambda f)/a$ in terms of radius). This makes it convenient to suppress a crosstalk from the second tracks adjacent to a track scanned by the main beam. It is therefore possible to read information in which a crosstalk is stably suppressed.

Preferably, the second optical pickup head apparatus is arranged such that: the polarized phase plate transmits, as the main beam, the light component having the polarized plane in the one direction out of the coherent light emitted from the coherent light source, with no relative phase difference given thereto; the polarized phase plate includes two phase plate portions each having first, second and third zones which are partitioned by parallel zone boundary lines and of which areas are substantially equal to one another, the two phase plate portions being disposed such that the zone boundary lines of one phase plate portion are at right angles to the zone boundary lines of the other phase plate portion; each first zone gives a relative phase difference of zero to a portion of the light component having the polarized plane in the other direction at a right angle to the one direction, out of the coherent light emitted from the coherent light source, the portion above-mentioned passing through each first zone; each second zone gives a relative phase difference of $\pi/2$ to a portion of the light component having the polarized plane in the other direction, the portion above-mentioned passing through each second zone; each third zone gives a relative phase difference of $\pi$ to a portion of the light component having the polarized plane in the other direction, the portion above-mentioned passing through each third zone; and the polarized phase plate transmits, as the sub-beam, the light component passing through the first, second and third zones.

In such an arrangement, there can be obtained, from the single coherent light source, the main beam and the sub-beam presenting a four-peak distribution of light intensity, the sub-beam being formed by superposing beam portions each of which presents a two-peak distribution of light intensity in which peaks appear at both sides of the center of the main beam. This suppresses not only crosstalks from adjacent tracks of the optical disk, but also a crosstalk in the recording line density direction. It is therefore possible to read out a signal in which both intertrack interference and intersymbol interferance are suppressed.

Likewise the first optical pickup head apparatus, the second optical pickup head apparatus is preferably arranged such that: the polarized beam separating means is a polarized holographic element having a substrate of which refractive index is uniaxial and anisotropic, and a polarized hologram formed on the substrate.

Likewise the first optical pickup head apparatus, the second optical pickup head apparatus is preferably arranged such that: the photodetecting means includes a main beam detector for detecting the light intensity of the main beam, and a sub-beam detector unit for detecting the light intensity of the sub-beam; the sub-beam detector unit includes two photodetectors as divided in the tangential direction of the track at the reading point of the optical disk; and there is further disposed error signal supply means for supplying, as a tracking error signal, a differential output signal obtained from the two photodetectors.

BRIEF DESCRIPTION OF THE DRAWINGS

FIG. 4(a) and (b) show patterns formed on the polarized holographic optical element used in the optical pickup head apparatus according to the first embodiment, wherein (a) is a plan view and (b) is a section view taken along the line b—b in (a);

FIG. 13(a) to (d) are schematic views illustrating phase zones of phase plates used in other modifications of the optical pickup head apparatus according to the first embodiment;

DETAILED DESCRIPTION OF THE INVENTION

The following will discuss embodiments of the present invention with reference to the attached drawings.

Figure 1:
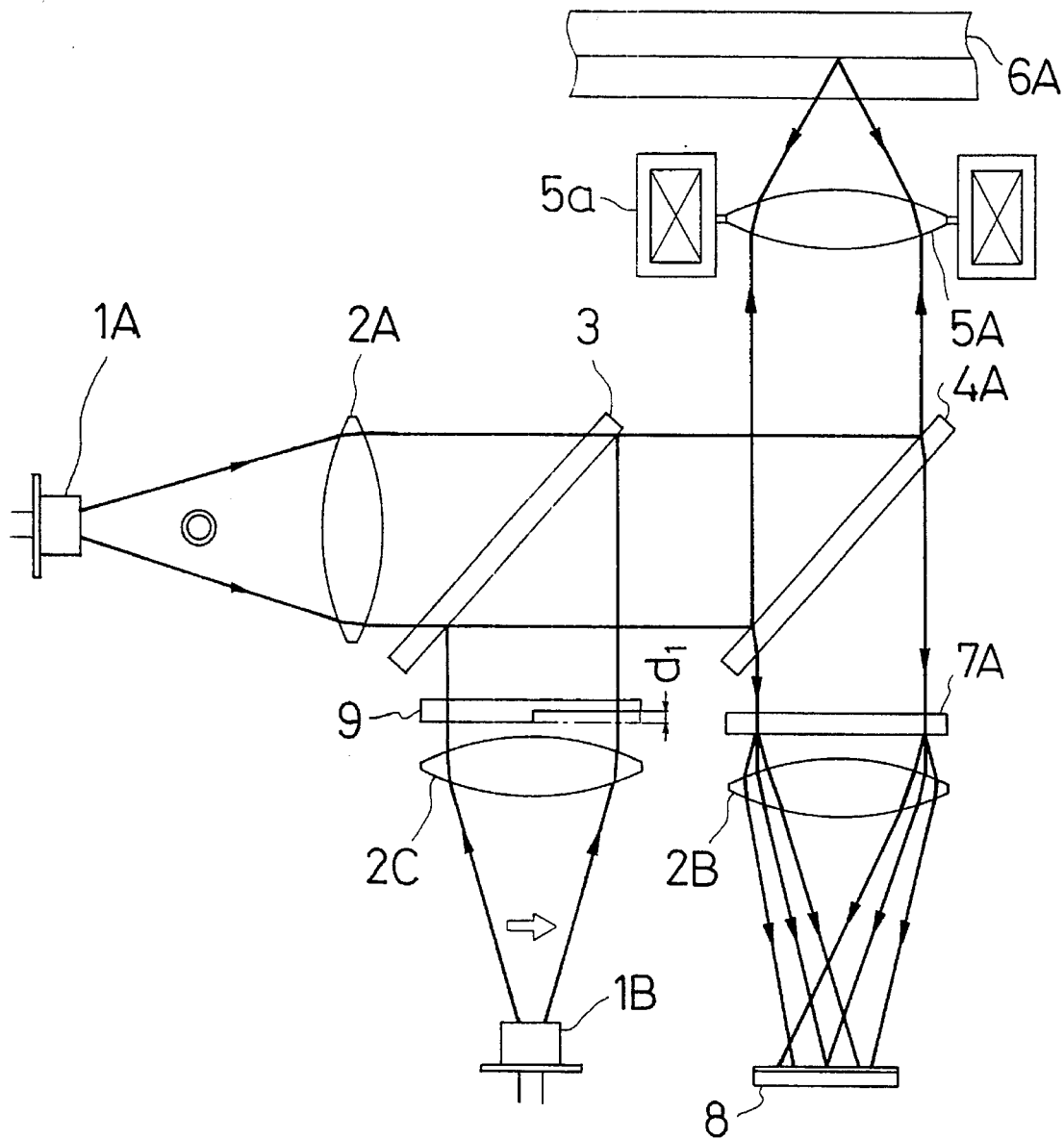
FIG. 1 is a schematic view of the arrangement of an optical pickup head apparatus according to a first embodiment of the present invention.

FIG. 1 schematically shows the arrangement of a first optical pickup head apparatus according to the present invention.

As shown in FIG. 1, a linearly polarized beam emitted from a first coherent light source 1A comprising a semiconductor laser, passes through a first collimate lens 2A, a polarized beam splitter 3 and a beam splitter 4A. Then, the beam is focused by an objective lens 5A and forms an image on the pit surface (optical information-recorded surface) of an optical disk 6A. After having formed the image, the beam is reflected from the pit surface and passes, in a return path, through the objective lens 5A, the beam splitter 4A and a polarized holographic optical element 7A. Then, beam portions coming out from the polarized holographic optical element 7A are focused by a second collimate lens 2B and impinge on an integrated photodetector unit 8 comprising nine photodetectors. In FIG. 1, an actuator 5a is disposed for driving the objective lens 5A.

Figure 2:
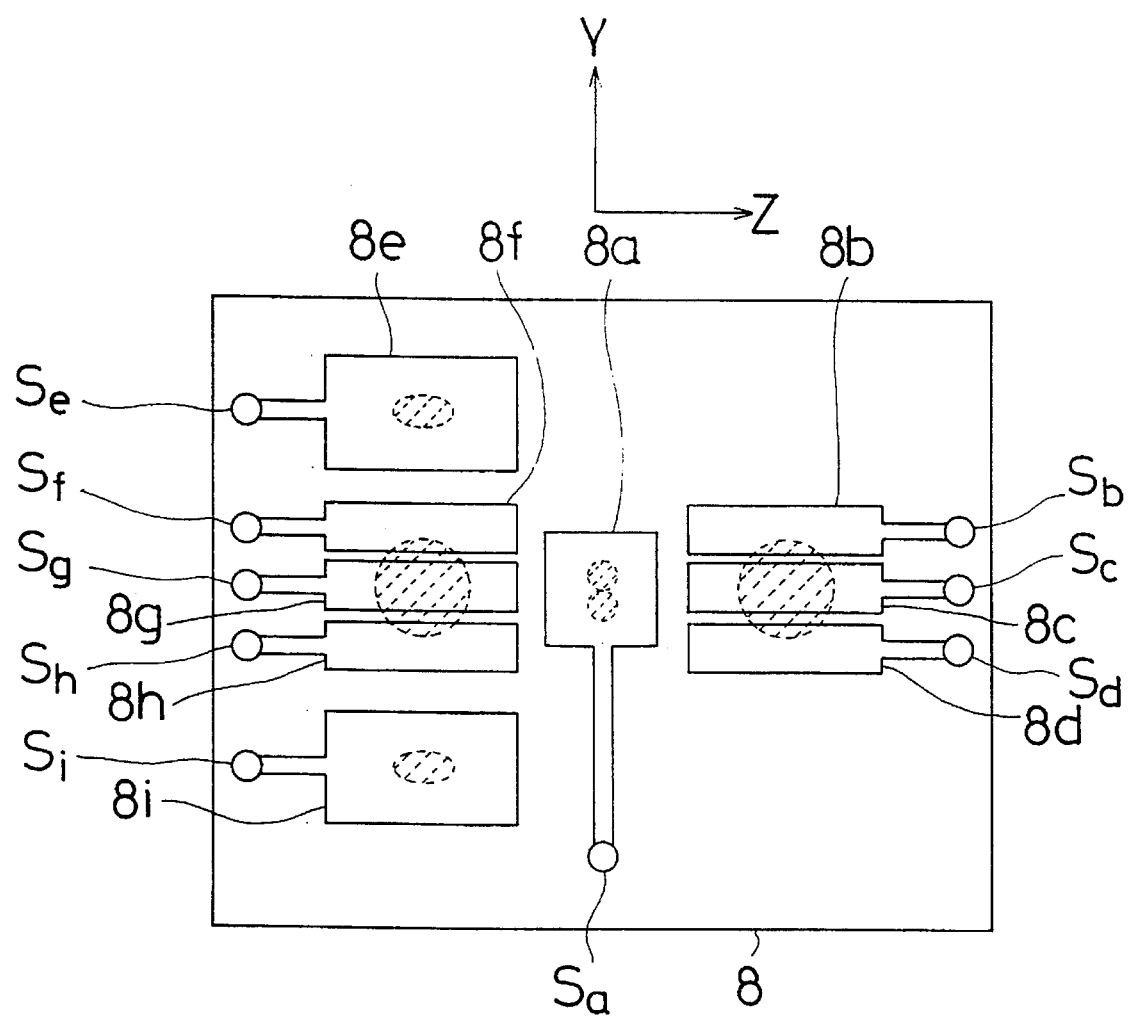
FIG. 2 is a plan view of an integrated photodetector unit used in the optical pickup head apparatus according to the first embodiment.

By the operation of the holographic optical element for achieving a spot size detection (SSD) method and a push-pull method for detecting a focusing error signal and a tracking error signal (See Japanese Patent Laid-Open Publication No. 50-78341, Japanese Patent Laid-Open Publication No. 62-251025, Japanese Patent Laid-Open Publication No. 62-251026 and U.S. Pat. No. 4,929,823), the beam portions which have reached the integrated photodetector unit 8 are detected by other eight photodetectors $8b$, $8c$, $8d$, $8e$, $8f$, $8g$, $8h$, $8i$ than a photodetector $8a$ which is located in the optical axis of the integrated photodetector unit 8 (FIG. 2 shows the detail).

Figure 3:
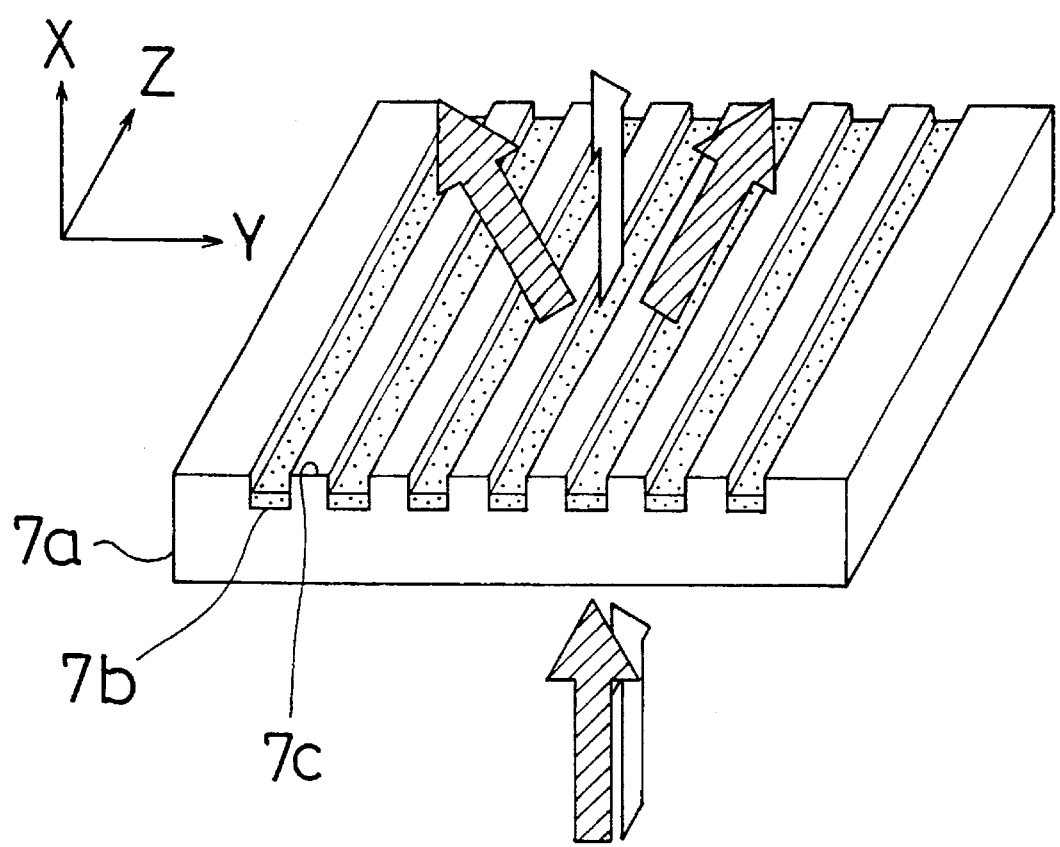
FIG. 3 is a perspective view of a polarizing hologram element used in the optical pickup head apparatus according to the first embodiment.

FIG. 3 shows details of the polarized holographic optical element 7A. This polarized holographic optical element 7A is a holographic optical element of which refractive index is anisotropic and is processed utilizing a proton exchange in which lithium Li in a substrate 7a is substituted by hydrogen H, the substrate 7a comprising a crystal of lithium niobate ($LiNbO_3$) and having a refractive index which is uniaxial and anisotropic. As shown in FIG. 3, when proton exchanged zones 7b in a grating pattern are formed on the substrate 7a of X-cut $LiNbO_3$ with the use of a photolithographic technology, the polarized holographic optical element 7A presents a $(0, \pi)$-type phase grating for a polarized component having a Y-directional polarized plane (hereinafter referred to as an ordinary light), and presents a uniform transparent substrate for a polarized component having a Z-directional polarized plane (hereinafter referred to as an extraordinary light). The beam from the first coherent light source 1A in FIG. 1 corresponds to the ordinary light (shown by ⊙ in FIG. 1), and is diffracted by the polarized holographic optical element 7A.

FIG. 4(a) and (b) show an example of patterns formed on the polarized holographic optical element 7A. FIG. 4(a) conceptually shows grating patterns on an off-axis Fresnel Zone-Plate for a focusing error signal detection, the grating patterns comprising the proton exchanged zones 7b and non-exchanged zones 7c formed on the substrate 7a of lithium niobate. Also, FIG. 4(a) conceptually shows grating patterns 7d, 7e for detecting a tracking error signal (in which proton exchanged zones and non-exchanged zones are alternately formed likewise in the first-mentioned grating patterns). FIG. 4(b) schematically shows the sectional structure of the polarized holographic optical element 7A taken along the line b—b in FIG. 4(a).

To diffract the ordinary light with the maximum efficiency with the extraordinary light not being diffracted, the thickness $d_3$ of each proton exchanged zone and the depth $d_2$ of each phase compensating groove (to be discussed later) should satisfy the following equations:

$$(2\pi/\lambda) \{\Delta n_o \times d_3 + (1-n_0) \times d_2\} = -\pi \quad (7)$$

$$(2\pi/\lambda) \{\Delta n_e \times d_3 + (1-n_e) \times d_2\} = 0 \quad (8)$$

wherein $\lambda$ is the wavelength of incident light; $\Delta n_o$ is a decrease in refractive index of the ordinary light due to proton exchange; and $\Delta n_e$ is an increase in refractive index of the extraordinary light due to proton exchange.

TABLE 1

|  | Substrate | Change in Refractive Index |
|---|---|---|
| Ordinary Light (y) | $n_o$ 2.260 | $\Delta n_o$ −0.04 |
| Extraordinary Light (x) | $n_e$ 2.177 | $\Delta n_e$ 0.145 |

Table 1 shows an example of data as to the refractive index of the substrate 7a of lithium niobate and changes in refractive index due to proton exchange.

Figure 6:
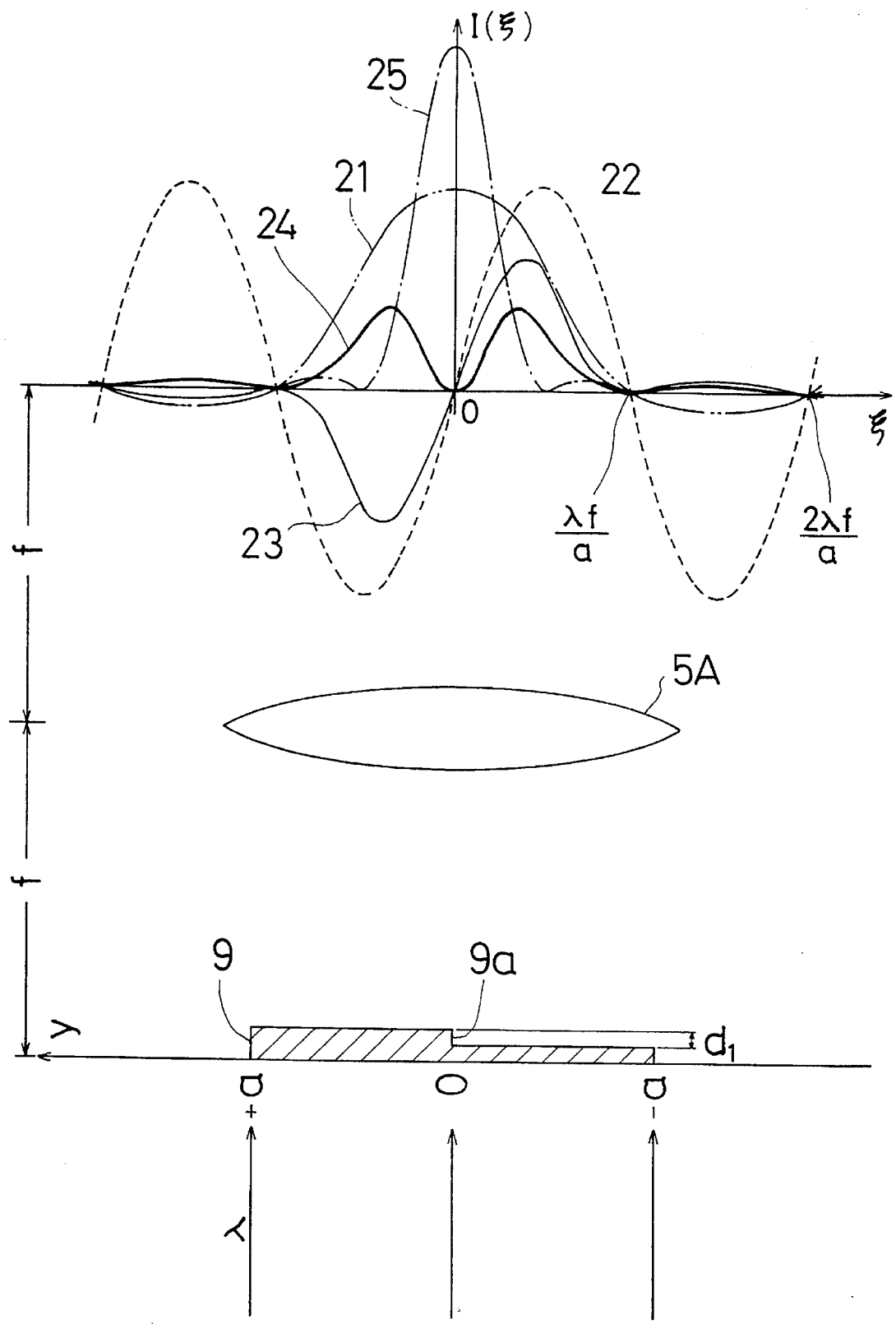
FIG. 6 shows the sectional structure and power spectral profiles of the phase plate used in the optical pickup head apparatus according to the first embodiment.

As shown in FIG. 1, a linearly polarized beam emitted from a second coherent light source 1B comprising a semiconductor laser, passes through a third collimate lens 2C, a phase plate 9 having (0, π)-type two phase zones as shown in detail in FIG. 6, the polarized beam splitter 3 and the beam splitter 4A. Then, the beam is focused by the objective lens 5A and forms an image on the pit surface of the optical disk 6A. After having formed the image, the beam is reflected from the pit surface and passes, in a return path, through the objective lens 5A, the beam splitter 4A and the polarized holographic optical element 7A. Then, beam portions coming out from the polarized holographic optical element 7A are focused by the second collimate lens 2B and reach the integrated photodetector unit 8.

The plane of polarization of the beam emitted from the second coherent light source 1B is at a right angle to the plane of polarization of the beam emitted from the first coherent light source 1A. More specifically, when the beam from the first coherent light source 1A is regarded as the ordinary light with respect to the crystallographic axis of the substrate 7a of the polarized holographic optical element 7A, the beam from the second coherent light source 1B is regarded as the extraordinary light.

FIG. 6 is a schematic view illustrating power spectral profiles of the phase plate 9. A transparent substrate having a refractive index n (for example, n of fused silica is about 1.45) for wavelength of λ=780 nm, has a step difference $d_1$ and it is now supposed that the following equation is established:

$$(1-n) \times d_1 = \lambda/2$$

For convenience' sake, a one-dimensional model is shown as an example. When the phase plate 9 having an aperture width 2a is illuminated by collimated lights each having a wavelength λ, a complex amplitude distribution u (ξ) obtained on the focal plane of the objective lens 5A is expressed by the following equations:

$$u(\xi) = \int_0^a e^{i\pi} \times e^{-i\frac{2\pi}{\lambda f} y\xi} dy + \int_{-a}^0 e^{-i\frac{2\pi}{\lambda f} y\xi} dy \quad (9)$$

$$= 2ia \left[ \sin\left(\frac{2\pi}{\lambda f} \times \frac{a}{2} \times \xi\right) \right] \times \left[ \text{sinc}\left(\frac{2\pi}{\lambda f} \times \frac{a}{2} \times \xi\right) \right] \quad (10)$$

In the equations above-mentioned, sincx is equal to (sinx)/x, and f is the focal length of the objective lens 5A.

Then, the power spectrum is obtained from the following equation:

$$I(\xi) = |u(\xi)|^2 \quad (11)$$

In FIG. 6, a long and two short dashes line 21 shows sinc $[(2\pi/\lambda f) \times (a/\lambda) \times \xi]$, a broken line 22 shows, for reference, sin $[(2\pi/\lambda f) \times (a/\lambda) \times \xi]$, a fine solid line 23 shows the term product of sinc $[(2\pi/\lambda f) \times (a/\lambda) \times \xi]$ and sin $[(2\pi/\lambda f) \times (a/\lambda) \times \xi]$, and a thick solid line 24 shows I(ξ) in the equation (11). A long and short dash line 25 shows, for comparison, the profile of a focused beam which is diffraction-limited by the opening width 2a of the phase plate (the peak value is shown in an optional scale). As apparent from FIG. 6, the half width of the two-peaks beam 24 as focused after having passed through the phase plate 9, spreads about twice as compared with the half width of the focused beam 25 of diffraction limit. Accordingly, it can be readily understood that the two-peaks beam 24 effectively serves as a sub-beam which can suppress a crosstalk generated at the time when the focused beam 25 is used as a main beam for reading information.

Preferably, the phase plate 9 is disposed in such a direction that a phase boundary line 9a thereof is parallel with the tangential direction of the track at the reading point of the optical disk 6A. In such an arrangement, the two-peaks beam 24 serving as the sub-beam scans the tracks adjacent to a track which is scanned by the focused beam 25 serving as the main beam, while there is maintained the positional relationship that the peaks of the two-peaks beam 24 overlap the base portions of the profile of the focused beam 25. Thus, an intertrack crosstalk can be suppressed.

Alternately, the phase plate 9 may be disposed such that the phase boundary line 9a thereof is at a right angle to the tangential direction of the track at the reading point of the optical disk 6A. Such an arrangement is suitable for suppressing a crosstalk of intersymbol interference in the recording line density direction. In this case, the main beam and the sub-beam can be simultaneously detected with no time delay. Accordingly, the object of suppressing the crosstalk can be achieved by a simple operational processing as shown in FIG. 7.

Figure 7:
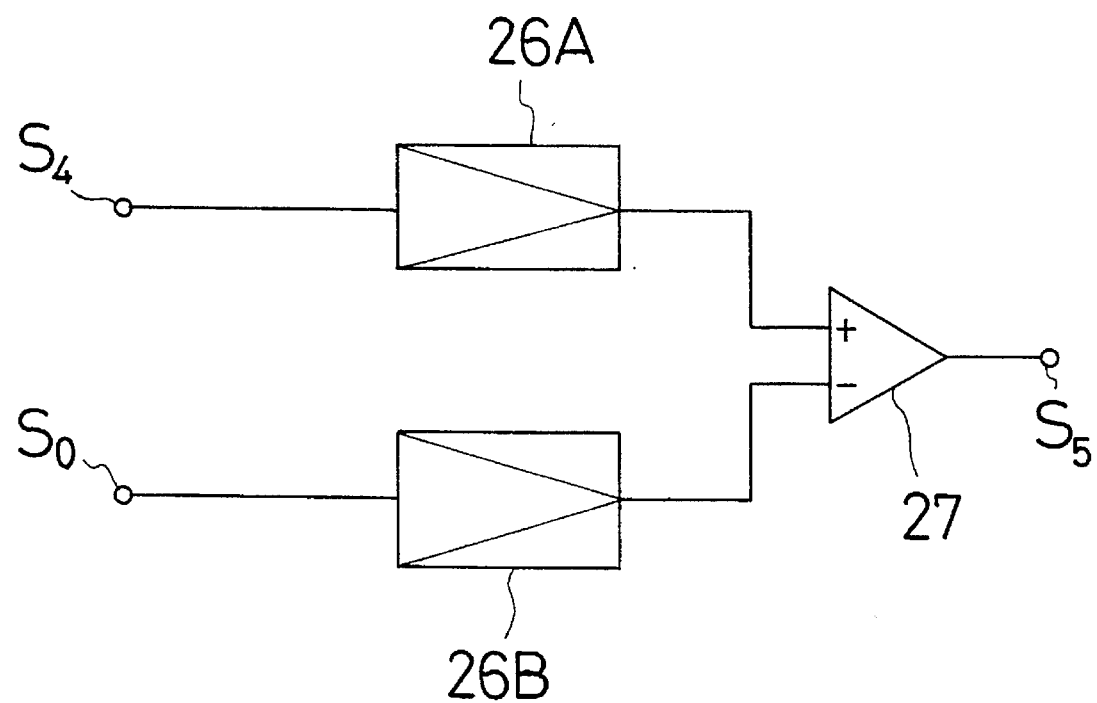
FIG. 7 is a schematic view of a reading-signal operating device used in the optical pickup head apparatus according to the first embodiment.

In FIG. 7, there are shown a first amplifying circuit 26A, a second amplifying circuit 26B and a differential operation circuit 27. An output $S_a$ of the photodetector 8a of the integrated photodetector unit 8 which has received the sub-beam, is entered into the second amplifying circuit 26B, and the total sum $S_4$ of output signals of the photodetectors 8b, 8c, 8d, 8f, 8g, 8h of the integrated photodetector unit 8 which have received the main beam, is entered into the first amplifying circuit 26A. Amplification factors $G_1$, $G_2$ of the first and second amplifying circuits 26A, 26B may be set such that a crosstalk component in an output $S_5$ from the differential operation circuit 27 is minimized. For example, when there is set, to 0.1:1.0, the ratio between (i) a crosstalk component in the total sum $S_4$ of output signals of the photodetectors 8b, 8c, 8d, 8f, 8g, 8h which have received the main beam, and (ii) a signal component in the output $S_a$ of the photodetector 8a which has received the sub-beam, the signal component being identical with the crosstalk component in the total sum $S_4$ of the output signals above-mentioned, the ratio of the amplification factor $G_1$ of the first amplifying circuit 26A to the amplification factor $G_2$ of the second amplifying circuit 26B may be set to 1:0.1.

In the foregoing, there has been discussed a method of suppressing a crosstalk by the differential operation circuit 27 having a simple arrangement. However, it is a matter of course that a plurality of delay circuits and memory circuits may be disposed to execute a multi-stage signal processing, so that the crosstalk component can be further suppressed and the wave forms can be equalized. Also, a widely used transversal filter (See the document by R. Katayama et al. above-mentioned) may be applied to the present invention.

Figure 8:
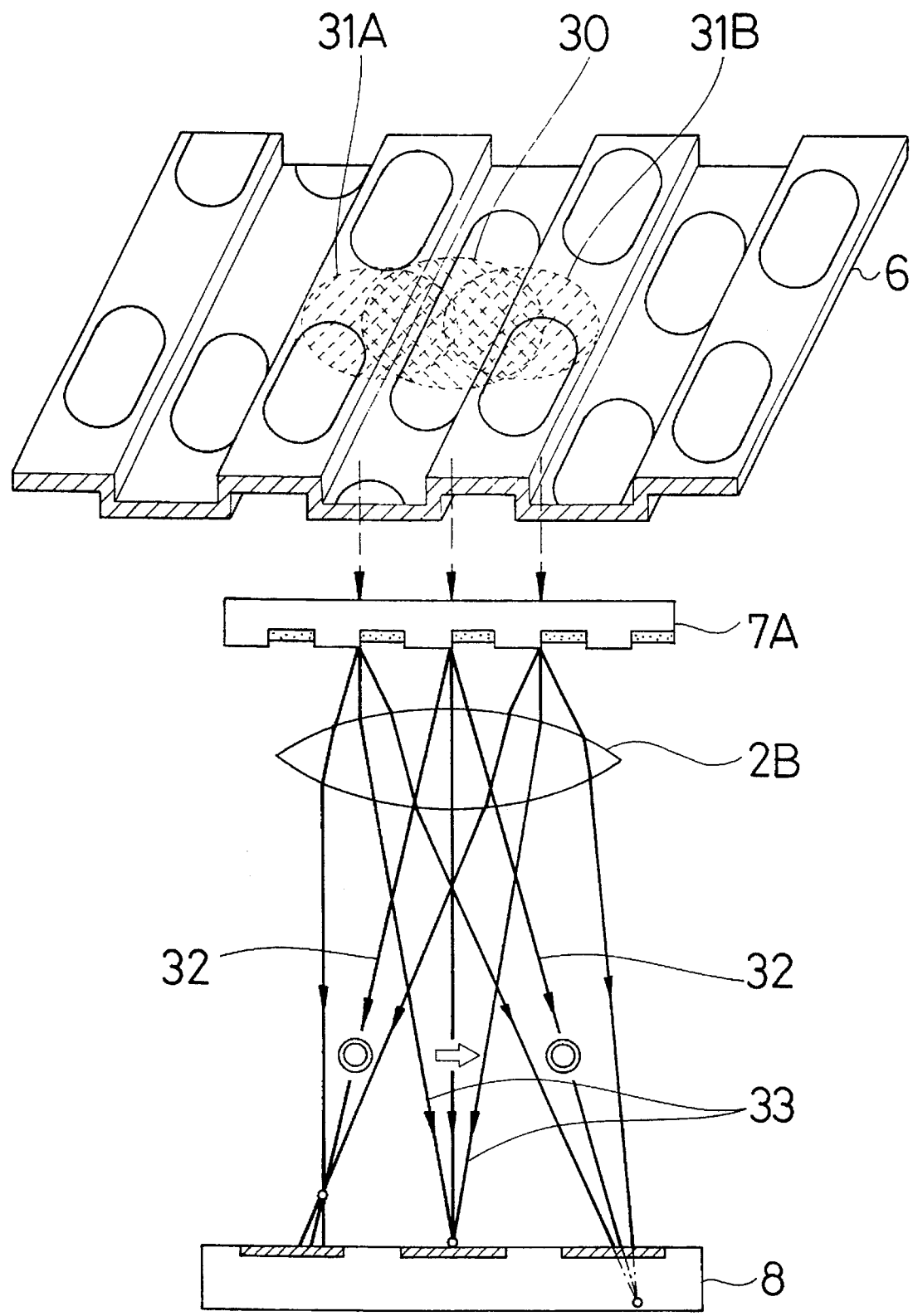
FIG. 8 illustrates an optical system used when the optical pickup head apparatus according to the first embodiment is applied to a grooved optical disk of the land groove type.

The first optical pickup head apparatus is used for a grooved optical disk of the land groove type capable of readily recording information with high density as shown in FIG. 8. When there is used, as an example of design, a grooved optical disk in which the land (groove) pitch is set to 1.6 µm as set in a normal disk, a tracking error signal can be sufficiently detected by a push-pull method. In FIG. 8, there are shown a beam spot 30 of a main beam 32, and beam spots 31A, 31B of a sub-beam 33 to be separated by a polarized beam separating means 7.

Figure 9:
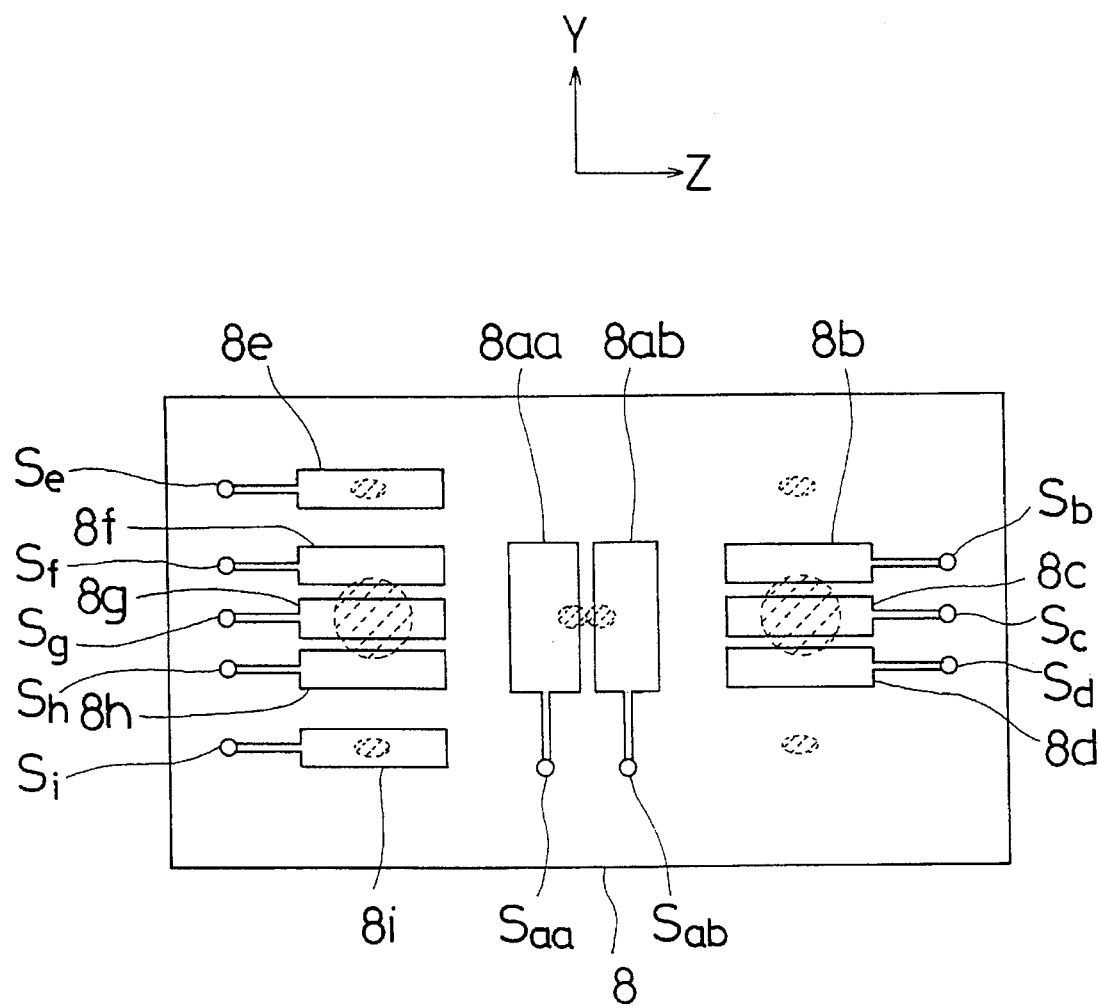
FIG. 9 is a plan view of an integrated photodetector unit used in a first modification of the optical pickup head apparatus according to the first embodiment.
Figure 23:
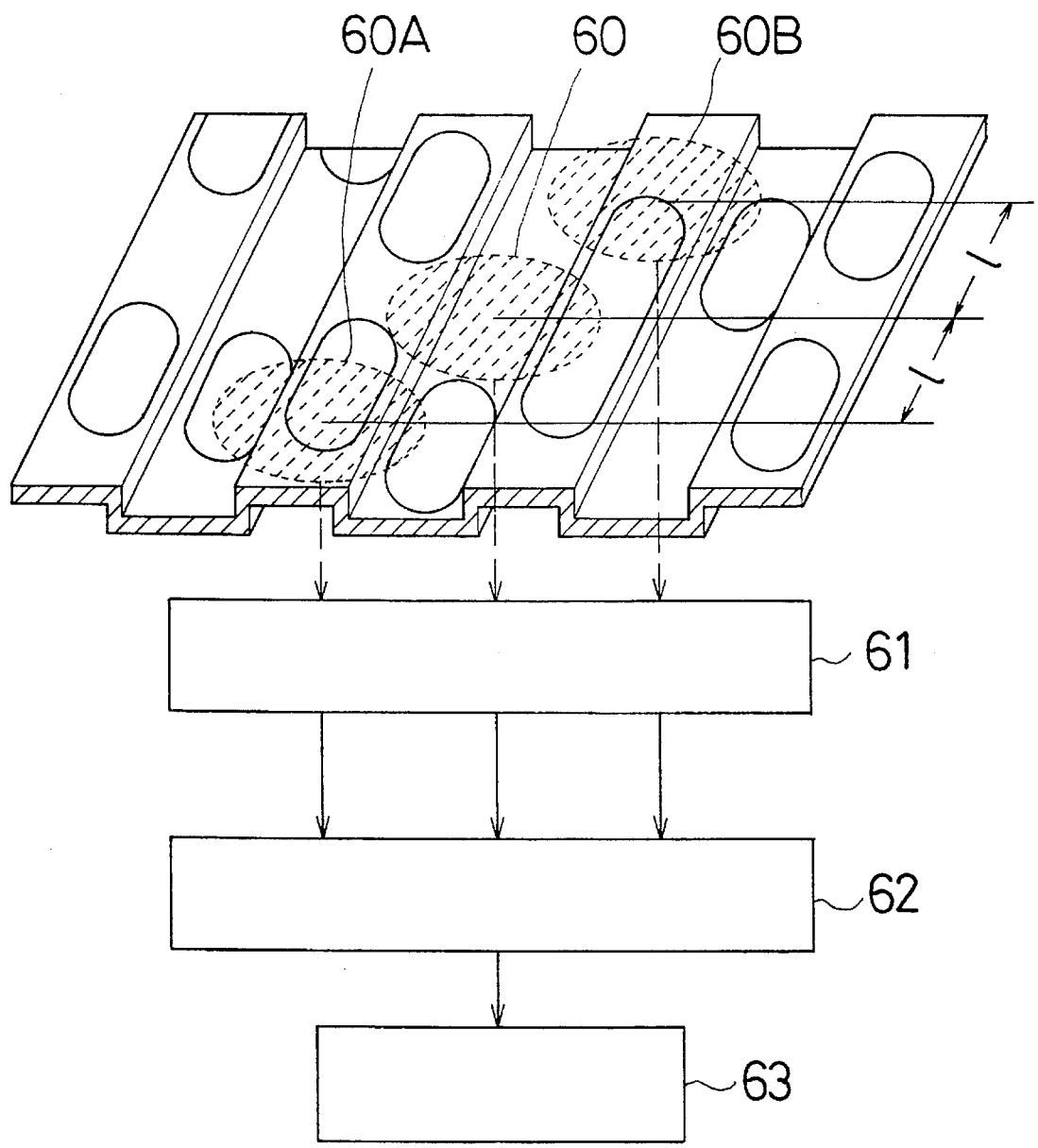
FIG. 23 is a view illustrating a distribution of focused beams obtained when a conventional optical pickup head apparatus is applied to a grooved optical disk of the land groove type.

FIG. 9 shows a first modification of the first optical pickup head apparatus. In the first modification, the photodetector 8a in the integrated photodetector unit 8 in FIG. 2 is divided, in a Y direction (parallel to the tangential direction of the track at the reading point), into two photodetectors, i.e., a first photodetector 8aa and a second photodetector 8ab. With such an arrangement, output signals $S_{aa}$, $S_{ab}$ of the first and second photodetectors 8aa, 8ab can be subjected to an operational processing to suppress a crosstalk with higher precision. That is, there can also be executed an operation similar to that executed by an adaptive digital filter discussed in connection with FIG. 23.

Figure 11:
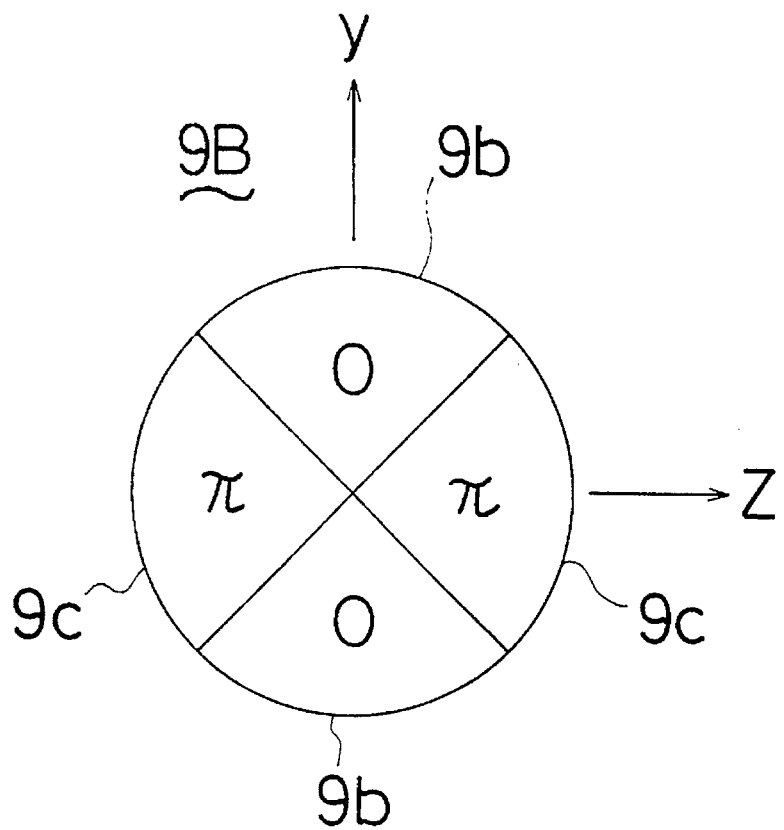
FIG. 11(a) is a schematic view illustrating phase zones of a phase plate used in a second modification of the optical pickup head apparatus according to the first embodiment.
FIG. 11(b) is a view showing a schematic distribution of focused beam obtained, on a power spectral plane, when the phase plate above-mentioned is used.
Figure 11:
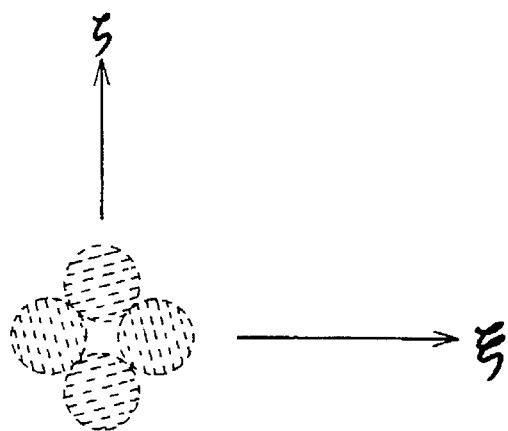

When a four-peak beam as shown in FIG. 11 to be discussed later is used, information can also be read out with high precision with the use of four-divided photodetectors. In such an arrangement, it is not required to compensate time delays among three beams, unlike in the arrangement in FIG. 23. Also, differential outputs from two- or four-divided photodetectors may be used to obtain a tracking error signal from the sub-beam. In such an arrangement, with no influence of a focusing error by the main beam, a tracking error signal can be obtained, assuring a stable tracking control. Generally, it becomes difficult to stably detect a tracking error signal as the distance between adjacent tracks becomes narrow. However, the first optical pickup head apparatus utilizes the feature of a two- or four-peak beam pattern for tracking control by the sub-beam. Thus, information can be stably read out even from an optical disk in which the distance between adjacent tracks is narrow.

Figure 10:
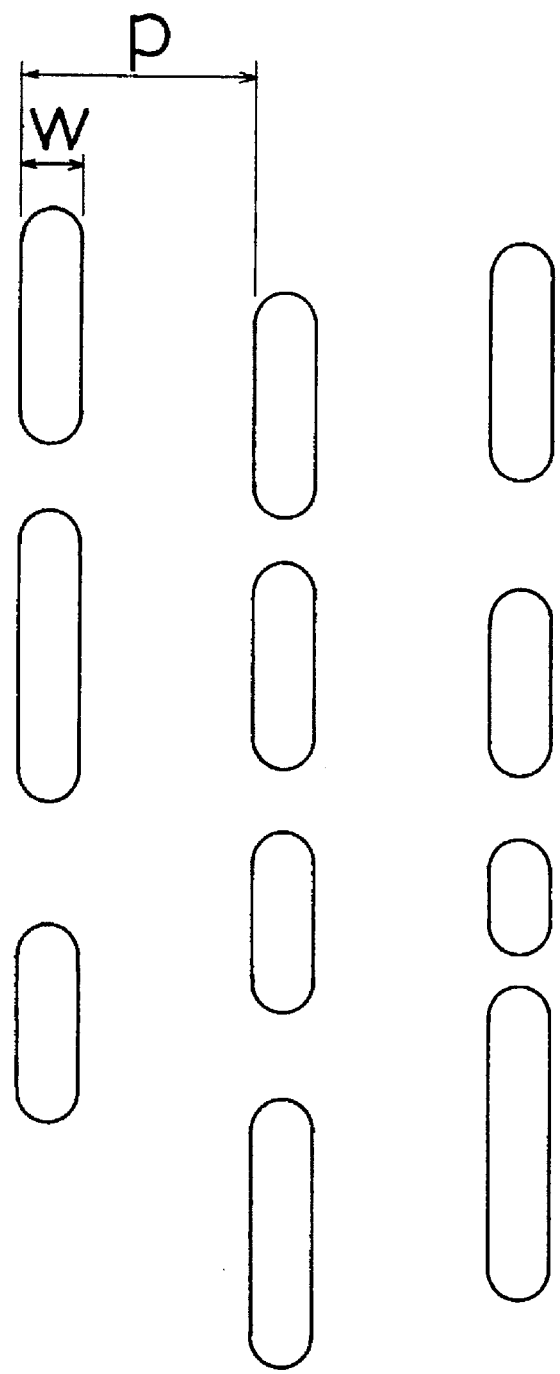
FIG. 10 is a view showing an information pattern of a plane-type optical disk having pit rows only.

FIG. 10 shows an example of information pattern of an optical disk 6A which is not of the land groove type but is of the plane type formed by pit rows only. For an optical disk 6A having a track pitch p and a pit width w of about (¼)xp as shown in FIG. 10, when there is calculated a difference between signals supplied from the two-divided first and second photodetectors 8aa, 8ab as shown in FIG. 9, the detection of a tracking error signal known as a three-beam method can be stably effected by the sub-beam.

The sub-beam of which polarized plane is at a right angle to the polarized plane of the main beam, scans the optical disk 6A with the center of the sub-beam always aligned with the center of the main beam on the pit surface of the optical disk 6A. In a return path, when the sub-beam is incident upon the polarized holographic optical element 7A, the sub-beam is not diffracted but passes, as the sub-beam 34 as polarized and separated as shown in FIG. 8, through the polarized holographic optical element 7A. Then, the sub-beam 34 is focused on and detected by the photodetector 8a of the integrated photodetector unit 8 (See FIG. 2).

Accordingly, a crosstalk can be suppressed by subtracting an output of a terminal $S_a$ from the total sum of outputs from eight terminals $S_b$ to $S_i$ of the integrated photodetector unit 8 shown in FIG. 2. In FIG. 6, the profile is shown with the ratio of the peak value of the beam power of the main beam to the peak value of the beam power of the sub-beam set to about 4:1. However, such a ratio may be set to about 10:1 for reading a double-density optical disk as shown in FIG. 8.

It is a matter of course that the system can be designed under optimum crosstalk suppressing conditions by using amplification and attenuation in an electric circuit. Similar effects can also be produced by adjusting the output ratio between the first coherent light source 1A and the second coherent light source 1B.

FIG. 11(a) schematically shows a phase plate 9B used in a second modification of the first optical pickup head apparatus. The phase plate 9B has phase zones 9b, 9c as divided into four zones around the center thereof. FIG. 11(b) schematically shows a distribution of a focused beam obtained, on the power spectral plane, when the phase plate 9B of the second modification is used. With the use of this phase plate 9B, a four-peak focused beam can be obtained so that there can be simultaneously cancelled in parallel both crosstalk components of intertrack interference and intersymbol interference generated when the main beam scans the pit surface of the optical disk 6A.

Figure 12:
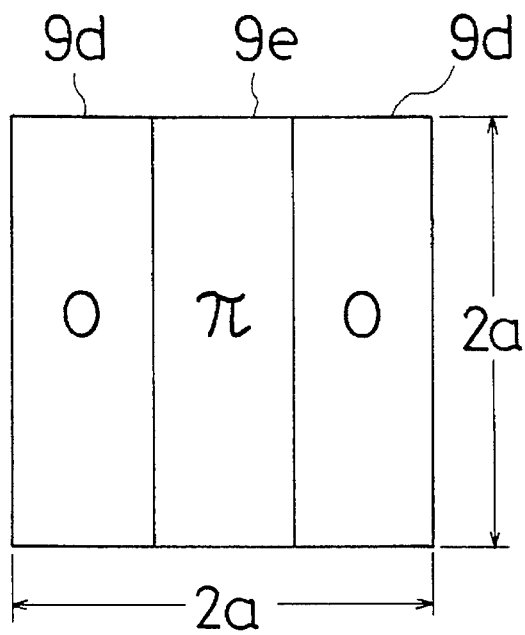
FIG. 12(a) is a schematic view illustrating phase zones of a phase plate used in a third modification of the optical pickup head apparatus according to the first embodiment.
FIG. 12(b) is a view of a schematic distribution of focused beam obtained, on a power spectral plane, when the phase plate above-mentioned is used.
Figure 12:
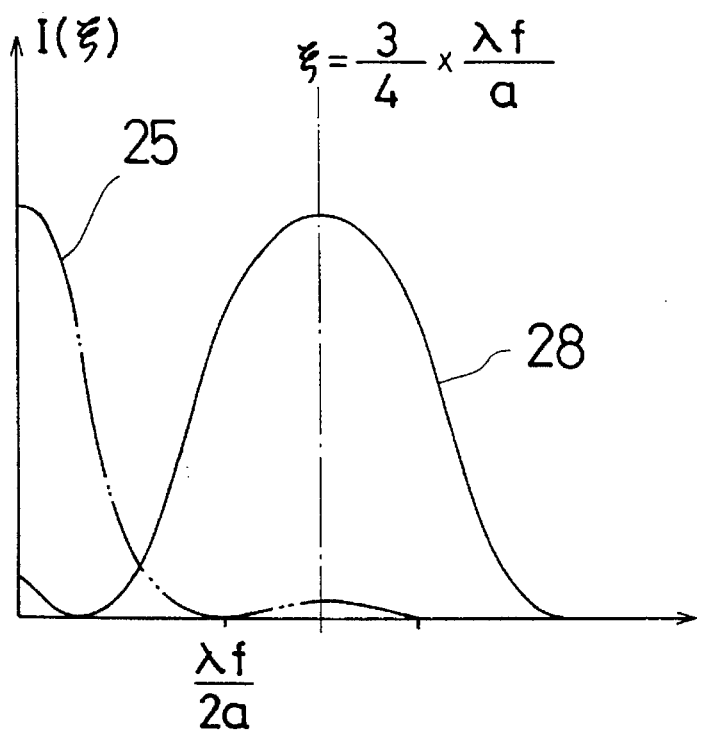

FIG. 12(a) schematically shows a phase plate 9C used in a third modification of the first optical pickup head apparatus. The phase plate 9C has phase zones 9d, 9e which are divided, by parallel zone boundary lines, into three zones of which areas are substantially equal to one another. FIG. 12(b) shows a beam profile 28 (ξ is not less than 0) on the focal plane of an objective lens system having a rectangular opening 2a when the phase plate 9C of the third modification is used.

FIG. 13(a) to (d) schematically show phase plates 9D, 9E, 9F, 9G used in other modifications of the first optical pickup head apparatus. As the division number is increased from 2 to 4, the peak positions of sub-beam are separated more from the optical axis.

In each of the first optical pickup head apparatus and the modifications thereof above-mentioned, the phase plate has a rectangular section, but there may be used a phase plate having a sine-wave or triangular-wave section. Also, there may be used a diffraction-type element or a phase plate with an amplitude distribution.

Figure 14:
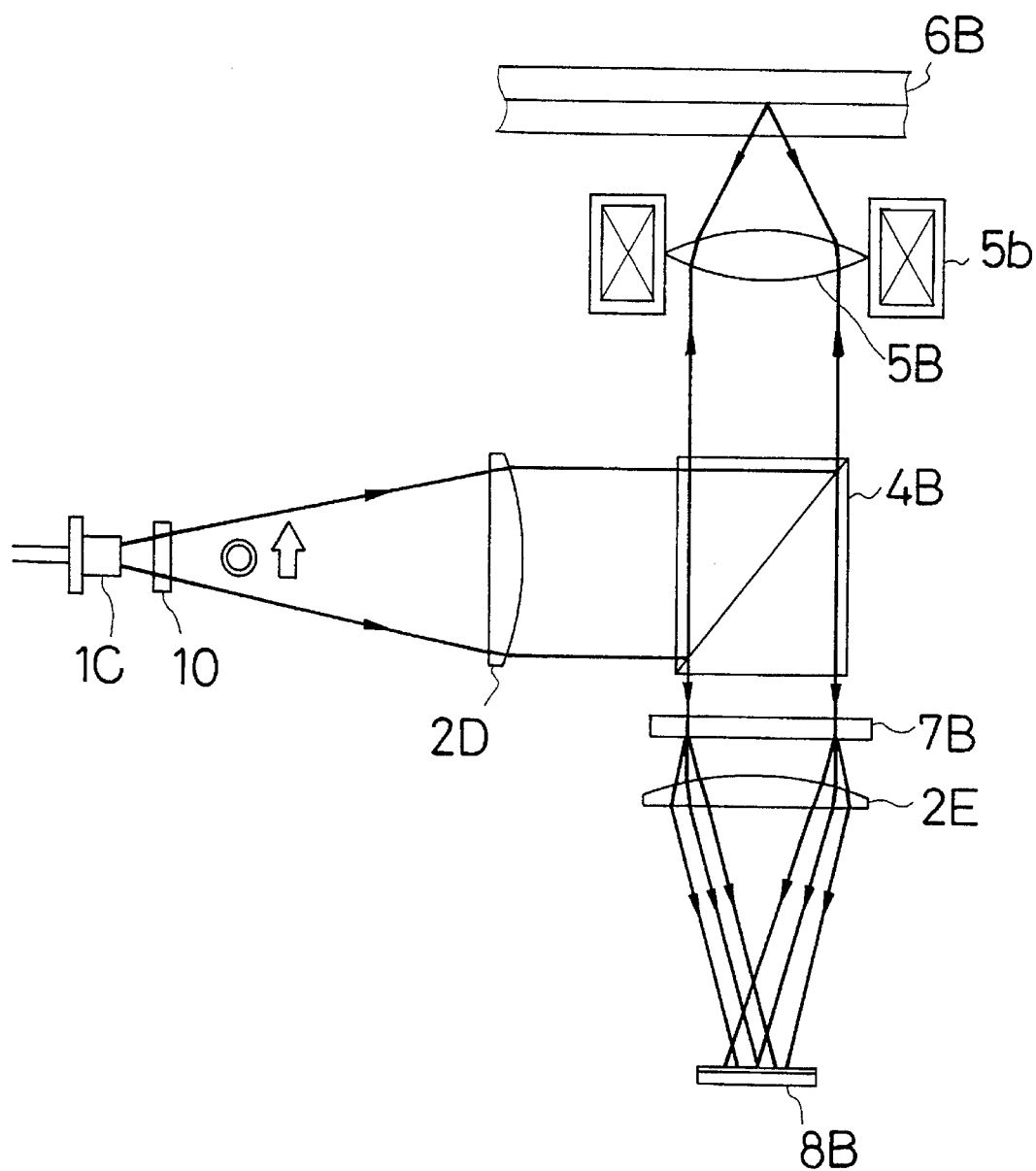
FIG. 14 is a schematic view of the arrangement of an optical pickup head apparatus according to a second embodiment of the present invention.

FIG. 14 shows the schematic arrangement of a second optical pickup head apparatus according to the present invention. In the second optical pickup head apparatus, the optical system in the first optical pickup head apparatus is simplified to reduce the number of component elements.

Figure 15:
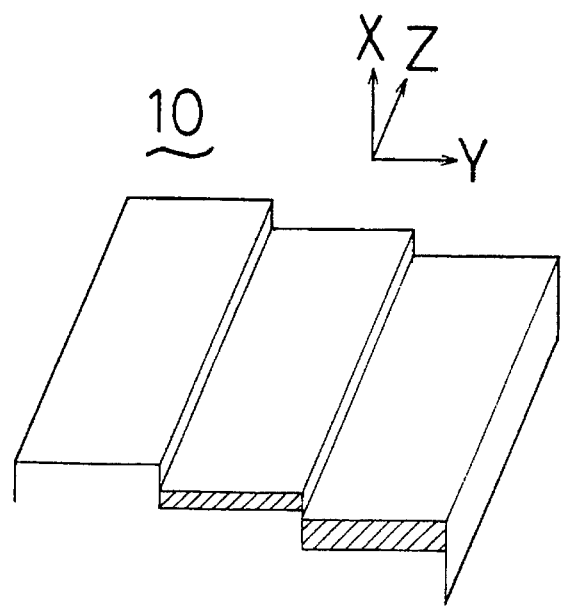
FIG. 15 is a schematic view illustrating phase zones of a polarized phase plate used in the optical pickup head apparatus according to the second embodiment.

As shown in FIG. 14, a beam emitted from a coherent light source 1C comprising a semiconductor laser, passes through a polarized phase plate 10 having at most several phase zones formed on a substrate of which refractive index is uniaxial and anisotropic (of which detail is shown in FIG. 15). Then, the beam passes through a collimate lens 2D and a beam splitter 4B. Then, the beam is focused by an objective lens 5B and forms an image on the pit surface of an optical disk 6B. In FIG. 14, an actuator 5b is disposed for driving the objective lens 5B.

Figure 16:
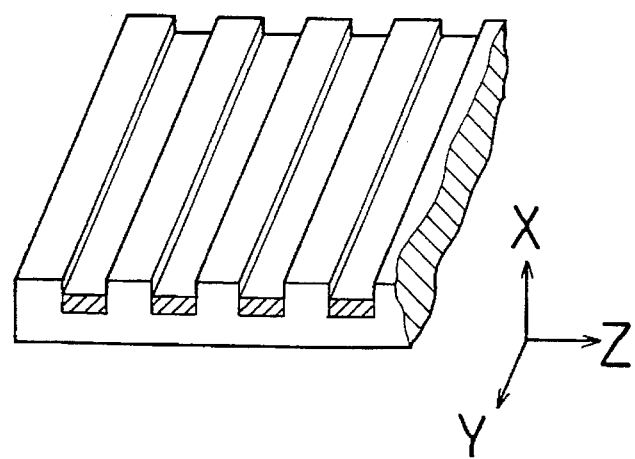
FIG. 16 is a schematic perspective view of a polarized holographic optical element used in the optical pickup head apparatus according to the second embodiment.

A polarized component of the beam emitted from the coherent light source 1C is so set as to contain, at a predetermined power ratio, an ordinary light (shown by O) and an extraordinary light (shown by a wide arrow) with respect to a substrate of a polarized holographic optical element 7B (of which detail is shown in FIG. 16) through which the beam passes in a return path. The beam emitted from the coherent light source 1C forms two wave surfaces $W_1$, $W_2$ of which polarized planes are separated from each other by the polarized phase plate 10.

Phase boundaries are formed, for example, in a Z-axis direction of $LiNbO_3$ such that the polarized phase plate 10 merely serves as a flat plate through which the ordinary light component uniformly transmits (See FIG. 15).

In one embodiment of the second optical pickup head apparatus, the polarized phase plate 10 has first and second zones, of which areas are substantially equal to each other, the apparatus is further arranged such that each of the first and second zones is divided into two zones such that the two zones obtained by dividing the first zone and the two zones obtained by dividing the second zone are alternatively disposed around the center of the polarized phase plate.

Figure 17:
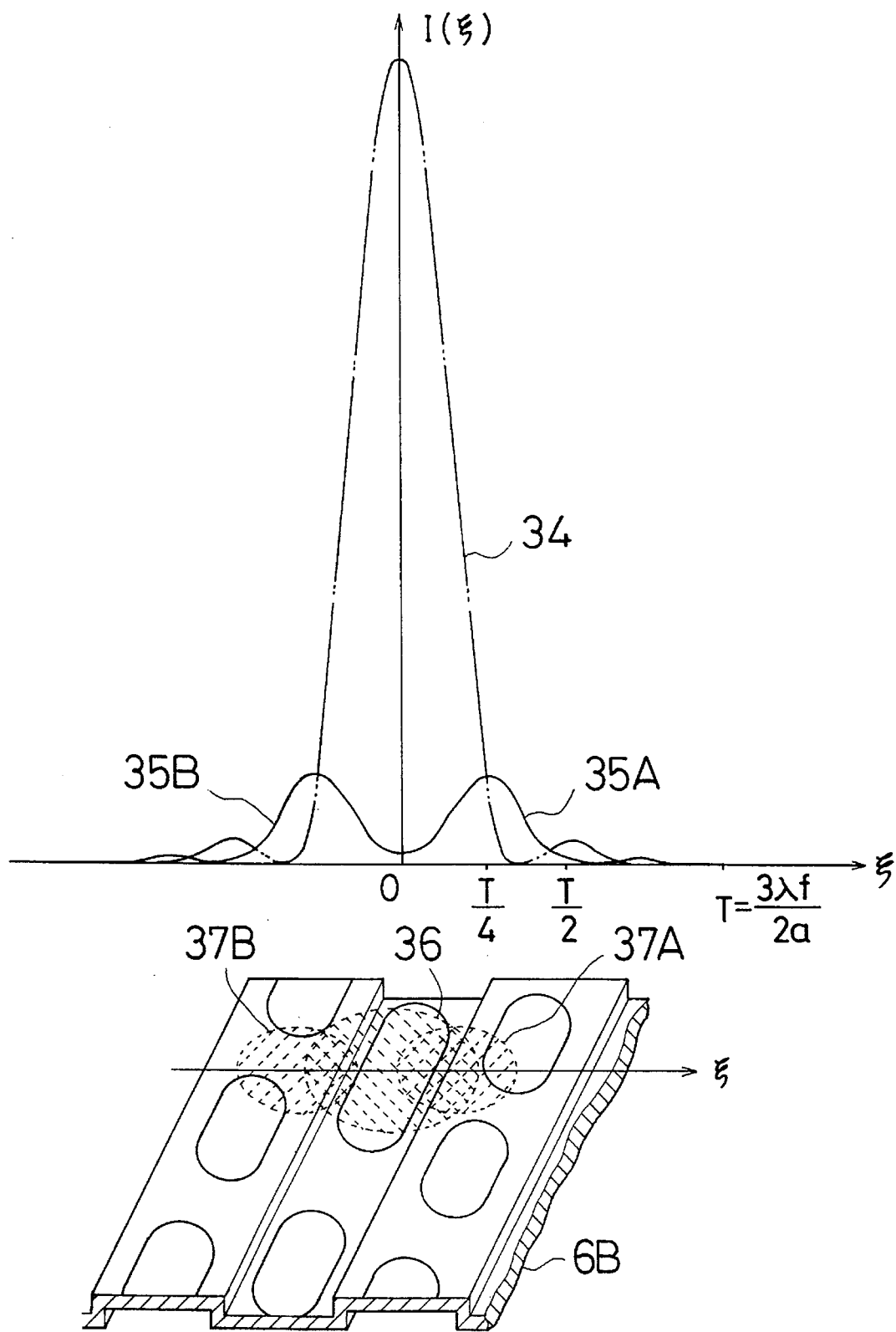
FIG. 17 is a schematic view illustrating how an optical disk surface is scanned by a main beam and a sub-beam, as overlapping each other, formed by the optical pickup head apparatus according to the second embodiment.

In the following description, a component having the wave surface $W_1$ which is not changed by the polarized phase plate 10 and uniformly passes therethrough, is referred to as a main beam, and a component having the wave surface $W_2$ of which polarized plane is at a right angle to the wave surface $W_1$, is referred to as a sub-beam. As shown in FIG. 17, the main beam in a forward path forms, on the pit surface of the optical disk 6B, a beam profile 34 which is a diffraction limit, while the sub-beam in the forward path forms a two-peak beam profile 35A, 35B of which peak centers are located coincidentally with the center of the beam profile 34 of the main beam. In FIG. 17, there are shown a beam spot 36 of the main beam, and beam spots 37A, 37B of the sub-beam. In FIG. 17, the ratio of the peak value of the main beam to the peak value of the sub-beam is set to about 10:1. To minimize a crosstalk, under a differencial operation between signals read out by the main beam and the sub-beam, it is preferred to adjust the intensity ratio between the main beam and the sub-beam. Alternatively, provision may be made to minimize a crosstalk such that an operational processing is executed by an electric circuit after the output terminals of photodetectors.

In another embodiment of the second optical pickup head apparatus discussed below, the polarized phase plate includes two phase plate portions each having first, second and third zones which are partitioned by parallel zone boundary lines and of which areas are substantially equal to one another, the two phase plate portions being disposed such that the zone boundary lines of one phase plate portion are at right angles to the zone boundary lines of the other phase plate portion.

Figure 18:
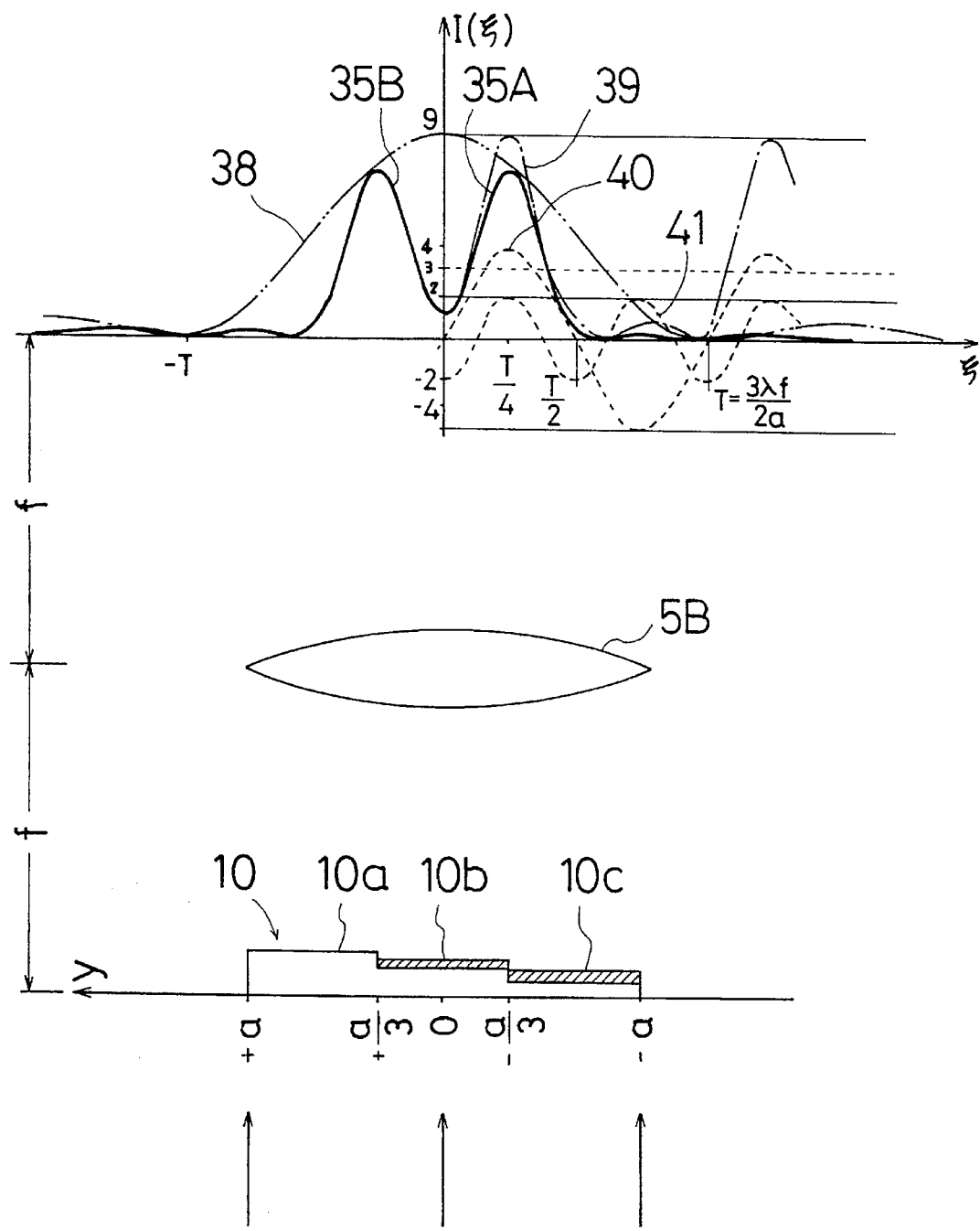
FIG. 18 shows the sectional structure and power spectral profiles of the phase plate used in the optical pickup head apparatus according to the second embodiment.

FIG. 18 shows the schematic sectional structure and power spectral profiles of the polarized phase plate 10 used in the second optical pickup head apparatus. In FIG. 18, proton exchanged zones 10b, 10c are arranged such that relative phase differences of $\pi/2$ and $\pi$ are given to an extraordinary light but no relative phase difference is given to an ordinary light with the zone 10a serving as a reference. When the effect of the polarized phase plate 10 for the extraordinary light is analyzed with a one-dimensional model taken as an example likewise in the description made in connection with FIG. 2, it is understood that the following two-peak beam profile is obtained. First, the Fourier spectrum is expressed by the following equation:

$$u(\xi) = \int_{+\frac{a}{3}}^{a} e^{+i\cdot\frac{\pi}{2}} \cdot e^{-i\cdot\frac{2\pi}{\lambda f} \cdot x\xi} dx + \int_{-\frac{a}{3}}^{\frac{a}{3}} e^{-i\cdot\frac{2\pi}{\lambda f} \cdot x\xi} dx + \int_{-a}^{-\frac{a}{3}} e^{-i\cdot\frac{\pi}{2}} \cdot e^{-i\cdot\frac{2\pi}{\lambda f} \cdot x\xi} dx \quad (12)$$

$$= \frac{2}{3} a \left[ \operatorname{sinc}\left(\frac{2\pi}{\lambda f} \cdot \frac{a}{3} \cdot \xi\right) \right] \times e^{-i\cdot\frac{2\pi}{\lambda f} \cdot \frac{2}{3} \cdot a\cdot\xi} \times e^{+i\cdot\frac{\pi}{2}} +$$

$$\frac{2}{3} a \left[ \operatorname{sinc}\left(\frac{2\pi}{\lambda f} \cdot \frac{a}{3} \cdot \xi\right) \right] +$$

-continued $$= \frac{2}{3} a \left[ \operatorname{sinc}\left(\frac{2\pi}{\lambda f} \cdot \frac{a}{3} \cdot \xi\right) \right] \times e^{-i\cdot\frac{2\pi}{\lambda f} \cdot \frac{2}{3} \cdot a\cdot\xi} \times e^{-i\cdot\frac{\pi}{2}}$$

Accordingly, the power spectrum is expressed by the following equation:

$$\begin{aligned} I(\xi) &= |u(\xi)|^2 \quad (13)\\ &= (4/9) \times a^2 \times \operatorname{sinc}^2((2\pi/\lambda f) \times (a/3) \times \xi) \times \\ &\quad [3 + 4\cos((2\pi/\lambda f) \times (2/3) \times a \times \xi - \pi/2) + \\ &\quad 2\cos((2\pi/\lambda f) \times (4/3) \times a \times \xi - \pi)] \end{aligned}$$

In FIG. 18, a two-peak beam profile 35A and 35B is a power spectrum corresponding to the equation (13). A profile on a long and short dash line 38 shows the term of $\operatorname{sinc}^2((2\pi/\lambda f)\times(a/3)\times\xi)$ in the equation (13). Also, a profile on a long and short dash line 39 shows the term of $[3+4\cos((2\pi/\lambda f)\times(2/3)\times a\times\xi-\pi/2)+2\cos((2\pi/\lambda f)\times(4/3)\times a\times\xi-\pi)]$ in the equation (13). A profile on a broken line 40 shows the term of $4\cos((2\pi/\lambda f)\times(2/3)\times a\times\xi-\pi/2)$ in the equation (13). A profile on a broken line 41 shows the term of $((2\pi/\lambda f)\times(4/3)\times a\times\xi-\pi)$ in the equation (13).

By disposing at most several phase zones on the aperture, the power spectrum of a beam passing through the polarized phase plate 10 has a half width (whichever is the greater) greater than that of the diffraction limited profile of a uniform beam of the same beam diameter, and there can be formed a beam of which intensity distribution on the axis is substantially near to zero.

Figure 5:
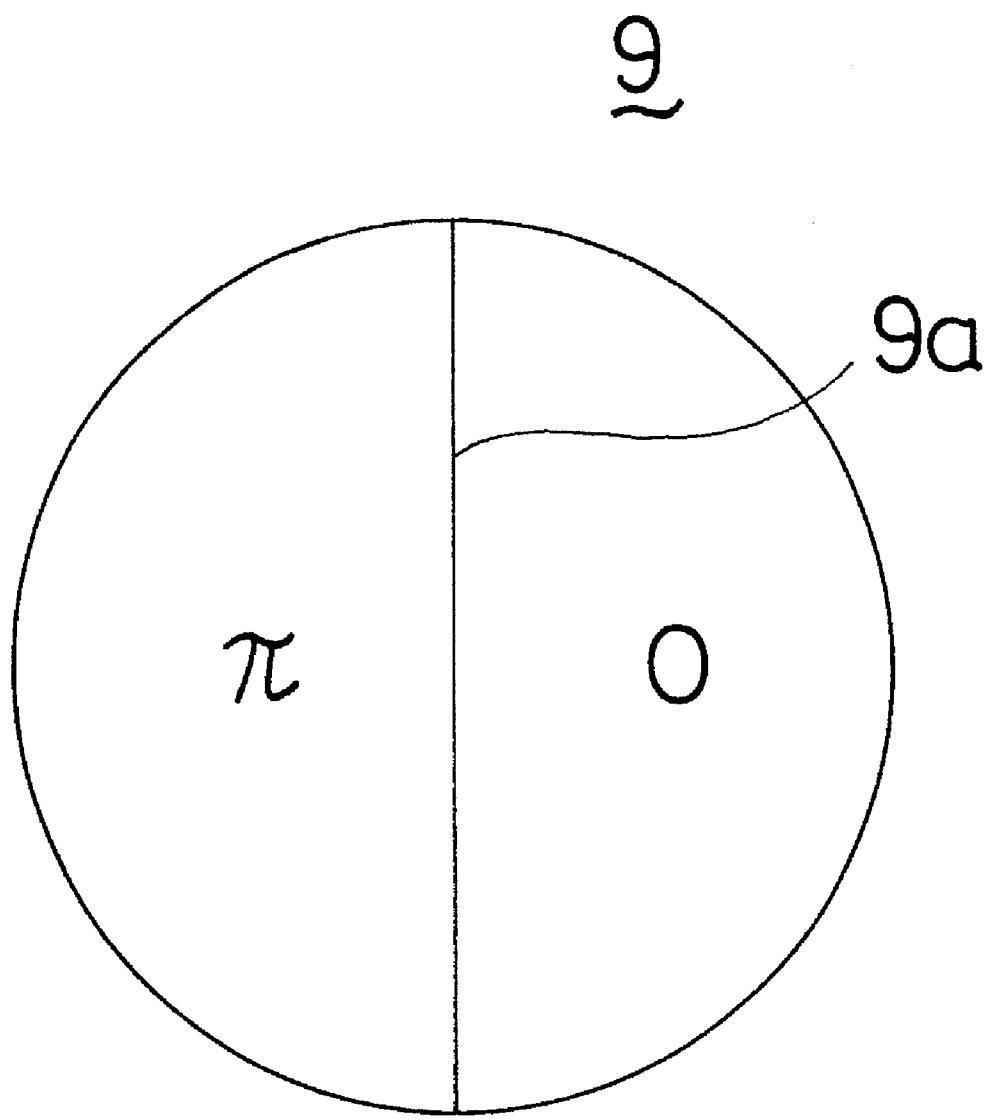
FIG. 5 is a schematic view illustrating phase zones of a phase plate used in the optical pickup head apparatus according to the first embodiment.

The present invention should not be limited to the optical pickup head apparatus above-mentioned. To form a sub-beam suitable for suppressing a crosstalk, any of the means discussed and shown in the foregoing can be combined and a different phase plate can be used. For example, the arrangement shown in FIG. 5 or 11 may be applied to a polarized phase plate.

Since a circular opening is used in an ordinary optical system, the sinc function should be replaced with the Bessel function. However, since the effect of suppressing a crosstalk is not changed even with the Bessel function used, no further description would be required.

For convenience' sake, the description has been made of the arrangement of the second optical pickup head apparatus on the assumption that the intensity distribution of a beam emitted from the coherent light source 1C presents a profile which is rotationally symmetric with respect to the optical axis (for example, Gaussian distribution). In a semiconductor laser, however, an elliptical beam is actually emitted due to the structure of the active layer or the like. Accordingly, when the semiconductor laser is adjusted as rotated around the optical axis, the focused spot (which is elliptical if the spot is formed by the main beam) on the surface of an optical disk is also disadvantageously rotated. Accordingly, it is preferable to interpose a beam shaping optical system between the coherent light source 1C and the beam splitter 4B in FIG. 14, thus correcting the asymmetry of the beam profile.

Alternatively, the phase boundary on the polarized phase plate 10 may be formed at a position previously rotated by a predetermined angle with respect to the X axis, instead of rotating the coherent light source 1C. In such a case, the object of the present invention can be achieved merely by fine-adjusting the rotation of the polarized phase plate 10 or the coherent light source 1C. Thus, the problem above-mentioned can be solved.

As another modification of the second optical pickup head apparatus, a circular polarization laser may be used or a ½-wavelength plate may be disposed downstream of the advancing direction of a linearly polarized laser beam. In such an arrangement, there can be eliminated the need of shaping a beam emitted from the coherent light source 1C.

The following description will discuss a method of producing a polarized beam separating element on a substrate of which refractive index is uniaxial and anisotropic.

As to the polarized holographic optical element of the same type, U.S. Pat. No. 5,062,098 for example discloses an example of application thereof, and there can be utilized an anisotropic polarization of other substrate material such as a liquid crystal device.

The method used for producing the polarized holographic optical element in the second optical pickup head apparatus, is further excellent in view of production precision and cost, as will be discussed in the following. More specifically, an element in which LN has been subjected to proton exchange, causes an extraordinary light to present great variations of refractive index ($\Delta n_e$) in the proton exchanged zones as shown in Table 1. Accordingly, the element serves, for the extraordinary light, as a phase-type diffraction grating of which diffraction effect is great. However, the element also causes an ordinary light to present a slight difference in refractive index ($\Delta n_o$) in the proton exchanged zones. Thus, the diffraction grating as left with LN subjected to proton exchange, causes the ordinary light and the extraordinary light to simultaneously present variations of refractive index. Accordingly, the polarized beam separating function above-mentioned cannot be perfectly achieved, thus requiring to add a phase compensation. In a conventional method (A. Ohba et al., Jap. J. Appl. Phys., 28 (1989) 359), dielectric films are formed on the proton exchanged zones to compensate a phase difference produced in the ordinary light. This not only requires, in production of a polarized holographic optical element, the steps of deposition and patterning of dielectric films, but also presents the problem of positioning with high precision.

As already shown in FIG. 3, in the polarized beam separating element of the optical pickup head apparatus according to the present invention, the proton exchanged zones 7b are formed in the form of grating on the surface of the LN substrate (X-plate), thus forming a diffraction grating which is anisotropic with polarized light. In such an arrangement, as a method of phase compensation, only the proton exchanged zones 7b are etched as phase compensating grooves, unlike in a conventional method, and a phase difference between extraordinary lights respectively passing through the proton exchanged zones 7b and the proton non-exchanged zones 7c, is subtracted. That is, the phase compensating grooves present a refractive index of 1 (=the refractive index of air) which is smaller than that of the substrate (ordinary light: 1-$n_o$, extraordinary light: 1-$n_e$). Accordingly, when an increase in the refractive index for the extraordinary light ($\Delta n_e$) due to proton exchange is cancelled and the phase difference is eliminated, a decrease in the refractive index for the ordinary light by the phase compensating grooves, is added to a decrease in the refractive index ($\Delta n_o$) for the ordinary light due to proton exchange, so that the phase difference is inversely increased. The conditions under which the ordinary light is diffracted with the maximum efficiency and the extraordinary light is not diffracted, are given by the equations (7) and (8) above-mentioned.

Figure 19:
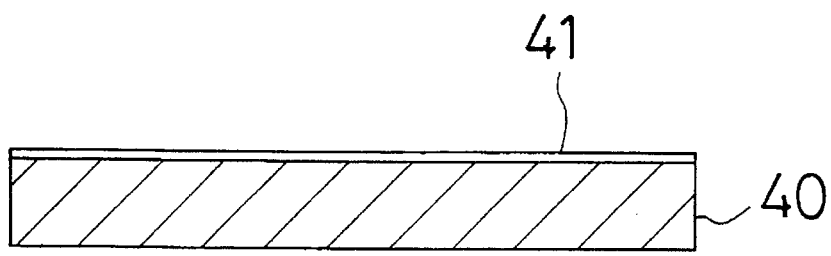
FIG. 19(a) to (d) are section views illustrating the steps of producing a polarized holographic optical element used in the optical pickup head apparatus according to each of the first and second embodiments.
Figure 19:
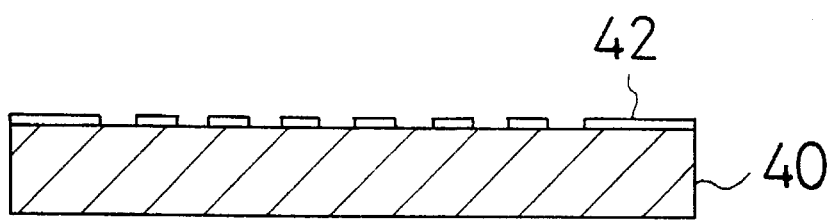
Figure 19:
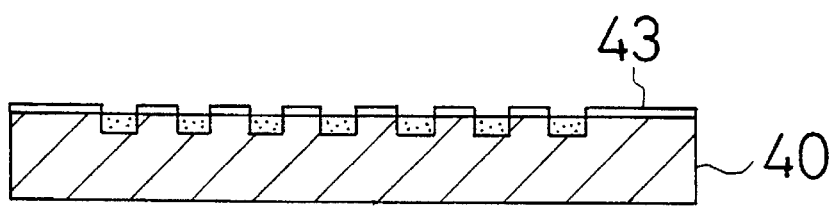
Figure 19:
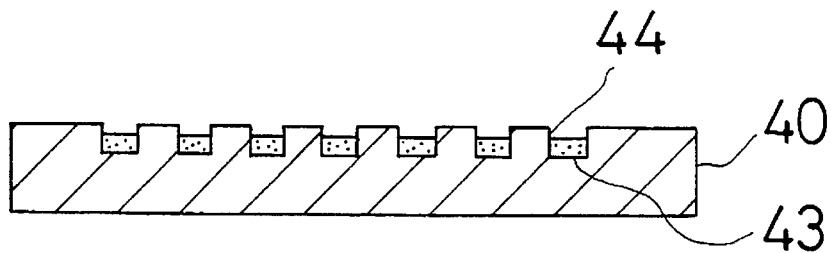

FIG. 19 shows the steps of producing the polarized holographic optical element 7B.

As shown in (a), a Ta film 41 having a thickness of 230 angstroms is formed, by a sputtering method, on the surface of a LN substrate (X-plate) 40 comprising LiNbO$_3$ having a thickness of 500 μm.

As shown in (b), the Ta film 41 is patterned by a photolithographic method and a dry etching method, thereby to form proton exchange masks 42 in the form of a grating.

As shown in (c), the substrate is thermally treated with a pyrophosphoric acid (H$_4$P$_2$O$_7$) at a temperature of 260° C. with the proton exchange masks 42 in the form of a grating serving as masks, thus forming proton exchanged zones 43 each having a depth of 2.38 μm.

By etching with hydrofluoric acid (HF), phase compensating grooves 44 are formed as shown in (d). The etching with hydrofluoric acid has the selective characteristics that the proton exchanged zones 43 are etched but the LN substrate 40 is not etched. With the use of such selective characteristics, the phase compensating grooves can be formed with no positioning required.

Figure 20A:
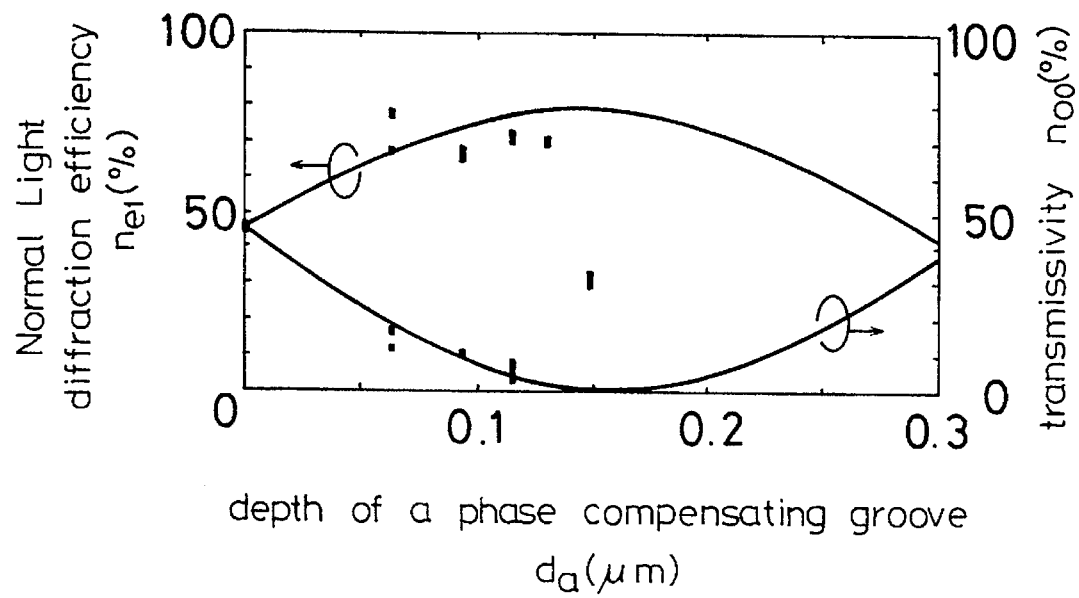
FIG. 20(a) and (b) are views illustrating the relationship among the depth of a phase compensating groove, the diffraction efficiency and the transmissivity of a polarized holographic optical element used in the optical pickup head apparatus according to each of the first and second embodiments.
Figure 20B:
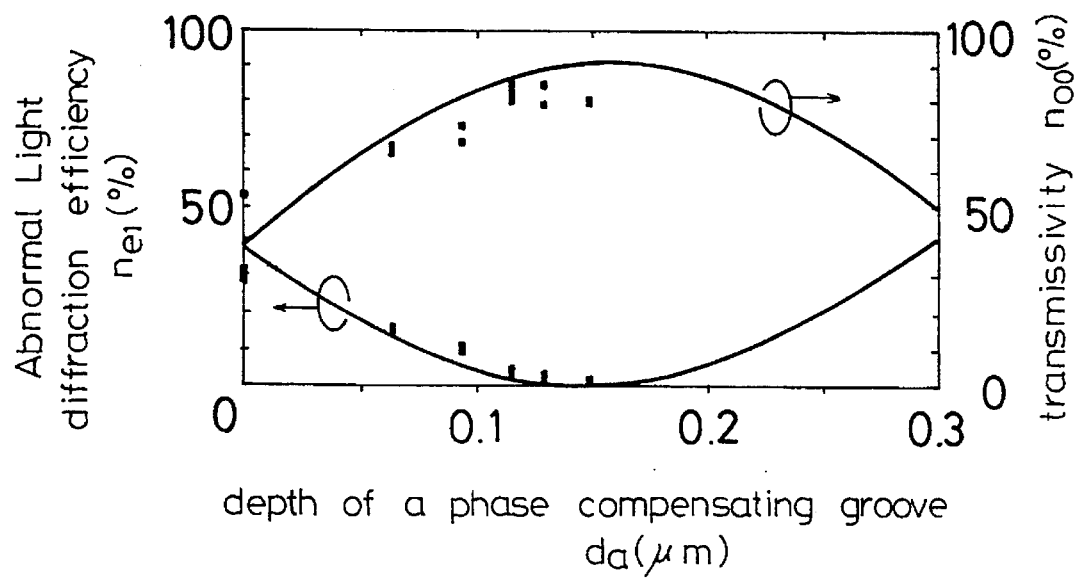
Figure 21:
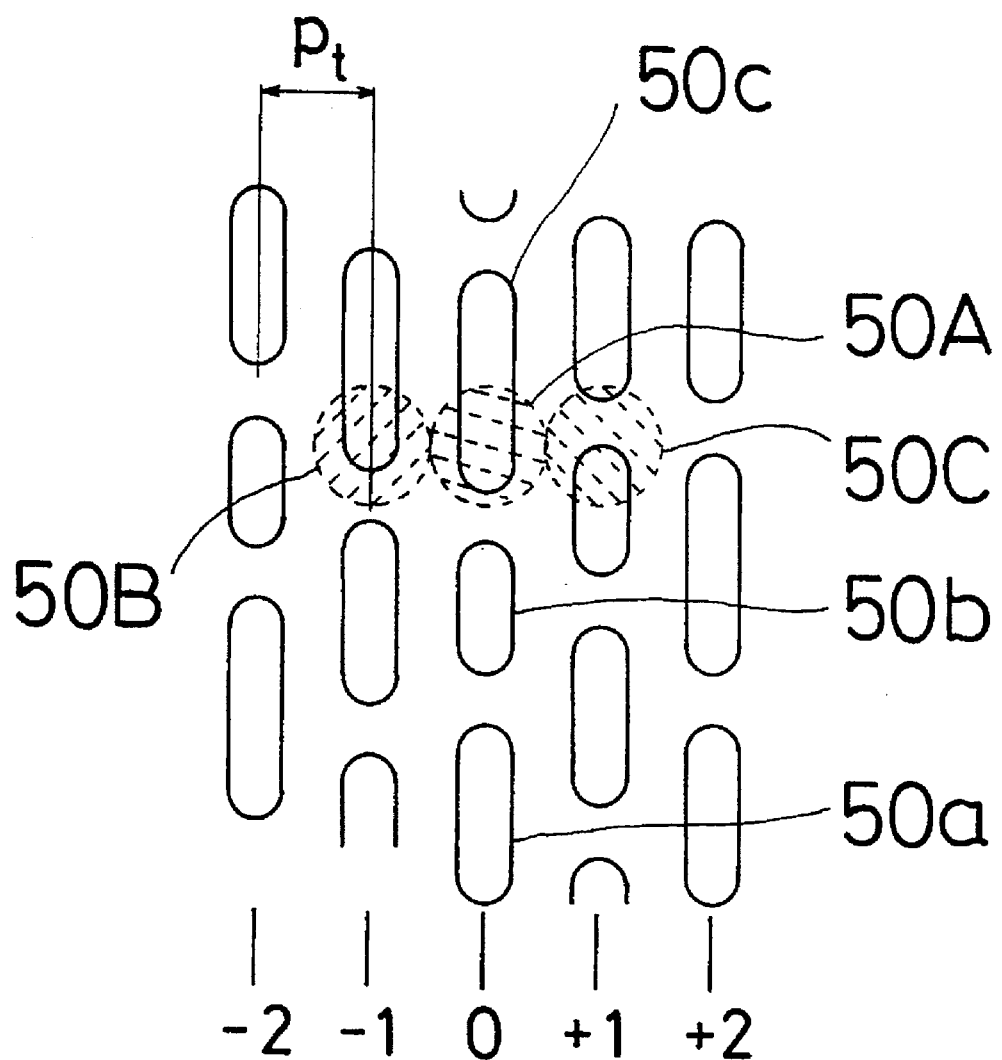
FIG. 21 is a view of a schematic distribution of focused beams illustrating a problem of a conventional optical pickup head apparatus.
Figure 22:
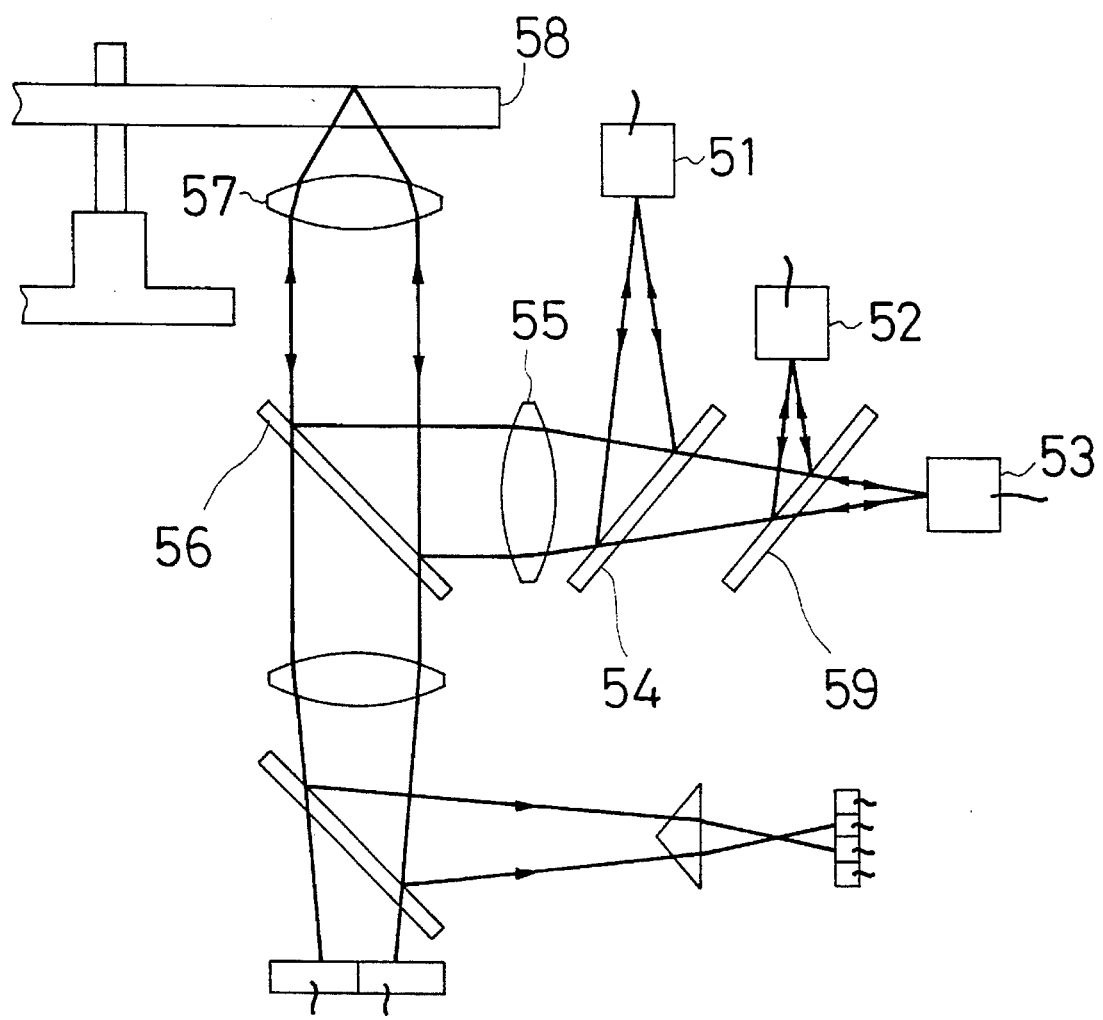
FIG. 22 is a schematic view of the arrangement of a conventional optical pickup head apparatus.

FIG. 20 shows the relation among the depth (μm) of each phase compensating groove, the diffraction efficiency (±1st order sum) (%) and the transmission (%). The data in FIG. 20 were obtained by measuring the diffraction efficiency and the transmission while successively etching the phase compensating grooves. The incident wavelength was equal to 780 nm. FIG. 20(a) and (b) respectively show the measured results of ordinary and extraordinary lights. As the depth of the phase compensating grooves is increased, the ordinary light presents an increase in phase difference, an increase in diffraction efficiency $n_{o1}$ and a decrease in transmission $n_{o0}$. On the other hand, in the extraordinary light, an increase in refractive index in the proton exchanged zones is cancelled by the phase compensating grooves. Further, the extraordinary light presents a decrease in diffraction efficiency $n_{e1}$ and an increase in transmission. The transmission $n_{e0}$ of the extraordinary light is minimized at the etching depth of 0.13 μm. At this time, the extinction rate was 24 dB for transmitted light (extraordinary light) and 17 dB for diffracted light (ordinary light), thus providing good characteristics.

What is claimed is:

1. An optical pickup head apparatus comprising:

a coherent light source for emitting a coherent light;

a polarized phase plate upon which said coherent light emitted from said coherent light source is incident for yielding a main beam and a sub-beam which has a polarized plane at a right angle to the polarized plane of said main beam and which presents a distribution of light intensity having peak values at at least both sides of the center of said main beam;

focusing means for overlapping, on each other, said main beam and said sub-beam transmitted through said polarized phase plate, causing the resulting overlapped beam to be focused on the information-recorded surface of an optical disk;

polarized beam separating means upon which a focused beam as reflected from said information-recorded surface of said optical disk is incident for yielding said incident beam as divided into said main beam and said sub-beam;

photodetecting means for individually detecting and supplying the light intensities of said main beam and said sub-beam transmitted through said polarized beam separating means; and reading signal operating means for operating, based on output signals from said photodetecting means, a reading signal in which a crosstalk is suppressed.

2. An optical pickup head apparatus according to claim 1, wherein:

the polarized phase plate divides the coherent light emitted from the coherent light source into a light component having a polarized plane in one direction and a light component having a polarized plane in other direction at a right angle to said one direction;

said polarized phase plate yields, as the main beam, said light component having said polarized plane in said one direction;

said polarized phase plate has first and second zones of which areas are substantially equal to each other;

said first zone gives no relative phase difference to a portion of said light component having said polarized plane in said other direction, said portion passing through said first zone;

said second zone gives a relative phase difference of $\pi$ to a portion of said light component having said polarized plane in said other direction, said portion passing through said second zone; and said polarized phase plate yields, as the sub-beam, said light component passing through said first and second zones.

3. An optical pickup head apparatus according to claim 2, wherein each of the first and second zones is divided into two zones such that the two zones formed by dividing said first zone and the two zones formed by dividing said second zone are alternately disposed around the center of the polarized phase plate.

4. An optical pickup head apparatus according to claim 1, wherein:

the polarized phase plate yields, as the main beam, the light component having the polarized plane in the one direction out of the coherent light emitted from the coherent light source, with no relative phase difference given thereto;

said polarized phase plate has first, second and third zones of which respective areas are substantially equal to one another;

said first zone gives a relative phase difference of zero to a portion of the light component having the polarized plane in the other direction at a right angle to said one direction out of said coherent light emitted from said coherent light source, said portion passing through said first zone;

said second zone gives a relative phase difference of $\pi/2$ to a portion of said light component having said polarized plane in said other direction out of said coherent light emitted from said coherent light source, said portion passing through said second zone;

said third zone gives a relative phase difference of $\pi$ to a portion of said light component having said polarized plane in said other direction out of said coherent light emitted from said coherent light source, said portion passing through said third zone; and said polarized phase plate yields, as the sub-beam, said light component passing through said first, second and third zones.

5. An optical pickup head apparatus according to claim 1, wherein:

the polarized phase plate yields, as the main beam, the light component having the polarized plane in the one direction out of the coherent light emitted from the coherent light source, with no relative phase difference given thereto;

said polarized phase plate includes two phase plate portions each having first, second and third zones which are formed by parallel zone boundary lines and of which areas are substantially equal to one another, said two phase plate portions being disposed such that the zone boundary lines of one phase plate portion are at right angles to the zone boundary lines of the other phase plate portion;

each of said first zones gives a relative phase difference of zero to a portion of the light component having the polarized plane in the other direction at a right angle to the one direction out of said coherent light emitted from said coherent light source, said portion passing through said each of said first zones;

each of said second zones gives a relative phase difference of $\pi/2$ to a portion of said light component having said polarized plane in said other direction out of said coherent light emitted from said coherent light source, said portion passing through said each of said second zones;

each of said third zones gives a relative phase difference of $\pi$ to a portion of said light component having said polarized plane in said other direction out of said coherent light emitted from said coherent light source, said portion passing through said each of said third zones; and said polarized phase plate yields, as the sub-beam, said light component passing through said first, second and third zones.

6. An optical pickup head apparatus according to claim 1, wherein the polarized beam separating means is a polarized holographic optical element having a substrate of which refractive index is uniaxial and anisotropic, and a polarized hologram formed on said substrate.

7. An optical pickup head apparatus according to claim 1, wherein:

the photodetecting means includes a main beam detector for detecting the light intensity of the main beam, and a sub-beam detector unit for detecting the light intensity of the sub-beam;

said sub-beam detector unit includes two photodetectors as divided in the tangential direction of the track at the reading point of the optical disk; and there is further disposed error signal supply means for supplying, as a tracking error signal, a differential output signal obtained from said two photodetectors.

* * * * *